(12) United States Patent
Sprague

(10) Patent No.: US 9,188,498 B2
(45) Date of Patent: Nov. 17, 2015

(54) TIRE PRESSURE MEASURING DEVICE

(76) Inventor: James Kenyon Sprague, Dexter, MI (US)

( * ) Notice: Subject to any disclaimer, the term of this patent is extended or adjusted under 35 U.S.C. 154(b) by 506 days.

(21) Appl. No.: 13/618,271

(22) Filed: Sep. 14, 2012

(65) Prior Publication Data

US 2013/0073246 A1    Mar. 21, 2013

Related U.S. Application Data

(60) Provisional application No. 61/663,525, filed on Jun. 22, 2012, provisional application No. 61/536,191, filed on Sep. 19, 2011.

(51) Int. Cl.
*B60C 23/02*    (2006.01)
*G01L 17/00*    (2006.01)

(52) U.S. Cl.
CPC .................................... *G01L 17/005* (2013.01)

(58) Field of Classification Search
CPC ....... G01L 17/005; G01L 17/00; G06F 15/00; G06F 17/00; B60C 23/00; B60C 23/02; B60C 23/04; B60C 25/00; B60C 25/02; B60S 5/04; B25D 1/00; B25G 3/00
See application file for complete search history.

(56) References Cited

U.S. PATENT DOCUMENTS

| | | | |
|---|---|---|---|
| 4,089,226 A | 5/1978 | Kraska | |
| 4,479,386 A | 10/1984 | Beggs | |
| 4,630,470 A | 12/1986 | Brooke | |
| 4,799,375 A * | 1/1989 | Lally | 73/12.09 |
| 4,996,516 A | 2/1991 | Mason | |
| 5,117,835 A | 6/1992 | Mick | |
| 5,585,567 A * | 12/1996 | Van Manen | 73/702 |
| 5,837,897 A | 11/1998 | Jones | |
| 5,962,779 A | 10/1999 | Bass | |
| 6,339,960 B1 | 1/2002 | Costley | |
| 6,343,506 B1 | 2/2002 | Jones | |

(Continued)

FOREIGN PATENT DOCUMENTS

| | | | |
|---|---|---|---|
| EP | 0141013 A1 | 5/1985 | |
| EP | 0681168 A2 | 8/1995 | |

(Continued)

OTHER PUBLICATIONS

GB 2194061 A, Feb. 24, 1988, 8 pp.*

(Continued)

*Primary Examiner* — Toan Le
(74) *Attorney, Agent, or Firm* — Kinne IP Group, P.C.; Charles C. Kinne; Mary E. Adams

(57) ABSTRACT

A tire pressure measuring device is disclosed. The device includes a data generating impact module for striking a pneumatic tire, generating data correlative to the force imparted to the tire as a function of time and transmitting the data to a data gathering module. A data gathering module receives the data from the data generating impact module and communicates the data to a data processing module. A data processing module receives the data from the data gathering module, processes the data to determine the pressure of the pneumatic tire and communicates the determined pressure of the pneumatic tire to a tire pressure display. A tire pressure output display receives the determined pressure of the pneumatic tire and displays the calculated pneumatic tire pressure.

29 Claims, 30 Drawing Sheets

(56) References Cited

U.S. PATENT DOCUMENTS

| | | | |
|---|---|---|---|
| 6,736,004 | B2 | 5/2004 | Evans |
| 6,748,791 | B1 | 6/2004 | Georgeson |
| 6,959,594 | B2 | 11/2005 | Huang |
| 7,555,931 | B2 | 7/2009 | Palmer |
| 7,817,024 | B2 | 10/2010 | Ru |
| 7,882,732 | B2 | 2/2011 | Haralampu |
| 2001/0050611 | A1* | 12/2001 | Achterholt .................... 340/442 |
| 2002/0038570 | A1 | 4/2002 | Burns |
| 2002/0101335 | A1* | 8/2002 | Ghabra et al. ................ 340/426 |
| 2009/0315694 | A1 | 12/2009 | Sinnett |
| 2010/0089161 | A1 | 4/2010 | Taheri |

FOREIGN PATENT DOCUMENTS

| | | | |
|---|---|---|---|
| GB | 2194061 | A * | 2/1988 |
| WO | 0036382 | A2 | 6/2000 |
| WO | WO 0036382 | A2 * | 6/2000 |

OTHER PUBLICATIONS

WO 00/36382 A2, Jun. 22, 2000, 35 pp.*

* cited by examiner

TIRE PRESSURE MEASURING DEVICE

CROSS-REFERENCE TO RELATED APPLICATIONS

This application relates to and claims priority from U.S. Provisional Patent Application Ser. No. 61/536,191, filed Sep. 19, 2011, and U.S. Provisional Patent Application Ser. No. 61/663,525, filed Jun. 22, 2012.

FIELD OF THE INVENTION

An apparatus and method for fast and accurate tire pressure measurement is disclosed. In a preferred embodiment, the disclosed apparatus is an instrumented hammer sized to be hand-held. The instrumented hammer can accurately measure tire pressure by hitting the tread or sidewall of the tire. The apparatus includes an instrumented weighted head which records the acceleration or force versus time during impact. This data is analyzed with a processor and is used to calculate the corresponding tire pressure. The pressure is output via an alphanumeric display, or lights or an audible signal or an analogue read out.

In a more preferred embodiment, the on-board processor contained in the handle of the instrumented hammer is provided with a calibration used to calculate the pressure of the tire from the hammer impulse during impact.

In a yet more preferred embodiment, the instrumented hammer is provided with an input device such that information, such as type of tire can be input into the on-board processor.

In a still more preferred embodiment, the on-board processor contained in the handle of the instrumented hammer is provided with a library of calibrations for different types of tire which are used to calculate the pressure of the tire from the impulse during impact. The type of tire is input into the on-board processor so that the correct calibration is used for calculation.

In a further preferred embodiment, the instrumented hammer is provided with a wireless transmitter that transmits the data collected during the impact with the tire to a remote wireless base station. A processor, contained in the remote wireless base station is provided with calibration data used to calculate the pressure of the tire from the data gathered during impact. This wireless base station is provided with the means to output the tire pressure via an alphanumeric display, or lights or an audible signal or an analogue read out.

In a yet further preferred embodiment, the remote wireless base station is provided with an input device such that information, such as type of tire can be input into the processor contained in the remote wireless base station.

In a still yet more preferred embodiment, the processor, contained in the remote wireless base station is provided with a library of calibrations for different types of tire which are used to calculate the pressure of the tire from the impulse during impact. The type of tire is input into the processor contained in the wireless remote base station so that the correct calibration is used for calculation.

BACKGROUND OF THE INVENTION

There is need for fast and accurate methods and apparatus for measuring tire pressure. The following patents and published applications illustrate the efforts of others to address the problems identified and solved by the disclosure herein. As can be seen, there are a vast array of efforts already existing to provide a solution to the problems confronted when measuring tire pressure, but none provides the combination of features and advantages presented in the instant disclosure.

These references include: U.S. Pat. No. 7,882,732 entitled "Apparatus for Monitoring Tire Pressure," was issued to Haralampu, et al. on Feb. 8, 2011; U.S. Pat. No. 7,817,024, entitled "Vehicle Tire Warning System," was issued to Ru on Oct. 19, 2010; U.S. Pat. No. 7,555,931 entitled "Non-destructive Testing of the Lining of a Process Vessel," was issued to Palmer on Jul. 7, 2009; U.S. Pat. No. 6,959,594 entitled "External Mount Tire Pressure Sensor System," was issued to Huang on Nov. 1, 2005; U.S. Pat. No. 6,748,791 entitled "Damage Detection Device and Method," was issued to Georgeson, et al. on Jun. 15, 2004; U.S. Pat. No. 6,736,004 entitled "Ultra-wide Band Soil/Tire Interaction Radar," was issued to Evans, et al. on May 18, 2004; U.S. Pat. No. 6,343,506 entitled "Tyre Pressure Determination," was issued to Jones, et al. on Feb. 5, 2002; U.S. Pat. No. 6,339,960 entitled "Non-intrusive Pressure and Level Sensor for Sealed Containers," was issued to Costley, et al. on Jan. 22, 2002; U.S. Pat. No. 5,962,779 entitled "Method for Determining Tire Inflation Status," was issued to Bass on Oct. 5, 1999; U.S. Pat. No. 5,837,897 entitled "Testing Vehicle Tires," was issued to Jones, et al. on Nov. 17, 1998; U.S. Pat. No. 5,117,835 entitled "Method and Apparatus for the Measurement of Intracranial Pressure," was issued to Mick on Jun. 2, 1992; U.S. Pat. No. 4,996,516 entitled "Indicator of Under Inflated Tire," was issued to Mason on Feb. 26, 1991; U.S. Pat. No. 4,630,470 entitled "Remote Sensing of Vehicle Tire Pressure," was issued to Brooke, et al. on Dec. 23, 1986; U.S. Pat. No. 4,479,386 entitled "Insulation Bonding Test System," was issued to Beggs, et al. on Oct. 30, 1984; U.S. Pat. No. 4,089,226 entitled "System for Residual Tire Life Prediction by Ultrasound," was issued to Kraska, et al. on May 16, 1978; U.S. Patent Application Publ. No. 2002/0038570 entitled "Remote Pressure Indicator for Sealed Vessels Including Vehicle Tires," was applied for by Burns on Aug. 2, 2001; U.S. Patent Application Publ. No. 2009/0315694 entitled "Piezoelectric Triggering Mechanism," was applied for by Sinnett, et al. (as a PCT) on Mar. 14, 2006; and U.S. Patent Application Publ. No. 2010/0089161 entitled "Vibration Based Damage Detection System," was applied for by Taheri (as a POT) on Feb. 15, 2008.

These references are discussed in greater detail as follows.

U.S. Pat. No. 7,882,732 generally discloses an apparatus for monitoring the pressurization in a tire. The device has a magneto-mechanical pressure sensor in or on the tire and an electromagnetic excitation system. The electromagnetic excitation system interrogates the magneto-mechanical pressure sensor. The apparatus also has a receiver. The receiver receives information from the electromagnetic excitation system. The apparatus also has a data interpretation system for translating the received information into the tire pressurization state. The data interpretation system is connected to a display, which communicates the tire pressurization state to an operator. Thus, an apparatus for monitoring tire pressure in a tire 12 has magneto-mechanical sensors 20 embedded in or on tire 12 and an exciting system 22 external to the tire 12, as disclosed in FIGS. 1-2, 11-13, and further at Col. 8 Line 61 to Col. 10, Line 18; Col. 11, Line 3 to Col. 12, Line 3 and in Claims 1-2, 5 and 7-10.

U.S. Pat. No. 7,817,024 generally discloses an air pressure sensor (2) for a vehicle tire warning system includes a tubular housing (21) defining a chamber (218). An air pressure actuating device is seated in the chamber and is moveable back and forth in the chamber in response to air pressure change in the vehicle tire. A switch device to electrically connect a high air pressure warning circuit or a low air pressure warning circuit operates under the drive of the air pressure actuating device. The chamber of the tubular housing is communicated to the atmosphere via a connecting pipe (29).

U.S. Pat. No. 7,555,931 generally discloses a process for the non-testing of a refractory lined process vessel including the steps of: (a) striking an external wall of a process vessel internally lined with a refractory material with an impulse hammer; (b) measuring selected frequency characteristics of the refractory lined process vessel; and (c) analyzing the measured frequency characteristics and determining the integrity of the internal lining of refractory material from the measured frequency characteristics. More specifically, non-destructive testing of a pressure vessel includes the steps of: striking the exterior wall of a vessel to generate accelerator frequencies recorded on a data logger, as further disclosed in FIGS. 1-20; Col. 5, Line 29 to Col. 6, Line 40 and in Claims 1-7, 11, 13, 15-28 and 30-31.

U.S. Pat. No. 6,959,594 generally discloses an external mount tire pressure sensor system with a stretch sensor having a variable resistance longitudinal displacement characteristic. The stretch sensor is coupled to a processor which samples the resistance of the stretch sensor periodically. The sensor body is attached to the external side wall of a pneumatic tire so that the body is displaced by the tire side wall and the resistance is a function of internal tire pressure. When the processor determines that the pressure is below a threshold value, an RF generator is activated by the processor to generate a low tire pressure signal. This signal is converted by a receiver to a warning for the driver.

U.S. Pat. No. 6,748,791 generally discloses a damage detection device used to detect damage in bonded and laminated composite structures. A tap hammer or tap coin containing an acceleration sensor is connected to a circuit that can measure the width of an impact signal and then display the result. The result correlates to local stiffness of a structure. A method of determining the desired signal width and the method of using the damage detection device includes tapping a known good region and then tapping a suspect region. Readings from the two areas are used to determine whether the suspect region is within an acceptable range. The circuit determines the desired signal width by measuring from the time the impact signal exceeds a threshold to the time it falls below the threshold. Thus, an inspection device includes a hand-held hammer 10, 12, with an accelerator 13, connected to an oscilloscope and read out display 18. Cf. FIGS. 1-3; Col. 3, Line 50 to Col. 5, Line 29 and Claims 1-5.

U.S. Pat. No. 6,736,004 generally discloses a radar system for vehicle tire testing and analysis. The system may be mounted within the casing of a vehicle tire to measure the location of the inner casing of the tire (tire deformation) as well as the location of the tire/soil interface (tire footprint). The radar system may also be used to determine soil characteristics by analyzing the reflected signals. The system may have particular use in testing tires for use with on- or off-road surfaces. The system may also be used to monitor tire deformation, traction, footprint, and soil characteristics.

U.S. Pat. No. 6,343,506 generally discloses a method and apparatus for determining tire pressure in automotive vehicles. The apparatus uses twin spaced parallel and non-transverse piezoelectric cables which are traversed by a vehicle to produce a voltage pulse having a shape or profile characteristic of the tire pressure. Waveform analysis on the basis of a software algorithm and/or look-up calibration data enables numerical pressure determination. The system is adapted for remote automotive vehicle tire pressure sensing under normal conditions of vehicle use.

U.S. Pat. No. 6,339,960 generally discloses a method and apparatus for determining the internal pressure of a sealed container. The method includes: first, exciting a lid of the container so as to create at least two modes of vibration having separate frequencies, wherein said frequencies are fundamental, $f_1$, and a second frequency, preferably the second axi-symmetric mode, $f_2$. Next, the vibration resulting from said exciting is detected to determine $f_1$, and $f_2$. Then, $f_2$, which is indicative of internal pressure, is used to calculate a first value for internal pressure using a first mathematical model that is calibrated to the lid on the sealed container. Then, $f_1$, which is indicative of volume of contents, is used to calculate the volume of contents in the sealed container using a second mathematical model that is calibrated to the lid on the sealed container, wherein a natural frequency of said lid is a function of said internal pressure and said volume of contents. Next, the volume of contents is compensated for to determine a second value for internal pressure, in which the second value for internal pressure is more reliable than said first value for internal pressure. The apparatus for determining the internal pressure of a sealed container of the invention includes: means for exciting a lid of the container so as to create at least two modes of vibration having separate frequencies, wherein said frequencies are fundamental, $f_1$, and a second frequency, preferably the second axi-symmetric mode, $f_2$; detecting means for detecting vibration resulting from the exciting of said container to determine $f_1$, and $f_2$ calculating means for calculating a first value for internal pressure of said container using $f_2$; calculating means for calculating the volume of contents of said container using $f_1$; wherein a natural frequency of said lid is a function of said internal pressure and said volume of contents; and calculating means for compensating for said volume of contents to determine a second value for internal pressure, wherein said second value for internal pressure is more reliable than said first value for internal pressure. Thus, a non-intrusive pressure sensor for sealed containers is disclosed. The sensor includes an accelerometer 2 connected to the lid of a pressure container with an impulse from an impact hammer producing a frequency 7 and calibrated to read vessel internal pressure. More detail is disclosed in FIGS. 5 A-E; Col. 7, Line 1 to Col. 8, Line 31 and in Claims 1-6.

U.S. Pat. No. 5,962,779 generally discloses a method and device for determining the inflation status of a vehicle tire while the tire is installed on the vehicle. A first signal is recorded representing the weight (Y) on a scale plate with respect to time when the tire is rolling on the scale plate. A second signal is recorded representing the weight (X) on a deformation bar with respect to time when the tire is rolling over the deformation bar. The maximum Y of the first signal and the maximum X of the second signal are determined. A ratio R is calculated by dividing the maximum X of the second signal by the maximum Y of the first signal. The calculated ratio R (=X/Y) is compared with a predetermined value for the ratio R pertaining to the maximum Y of the first signal. Apparatus is provided to give an under-inflation signal if the calculated ratio is below the predetermined value. Predetermined values for the ratios are obtained by determining, for a large number of combinations of vehicles and tires, the ratio R as a function of tire pressure. A threshold is calculated for each combination of vehicles and tires. A curve is fitted of predetermined values for the ratios R through points having as coordinates the corresponding maximum value Y of the weight on the scale plate with respect to time when the tire is rolling on the scale plate and the corresponding ratio pertaining to the threshold. The curve of predetermined values is fitted so as to define a smooth curve that is an envelope which lies below all threshold data but is as close to the data as possible. Thus, a tire inflation status apparatus comprising an impact means 20, load cells 14, 40, and computer 60 is disclosed. See FIGS. 1-3: Col. 3, Line 41 to Col. 5, Line 37 and Claims 1-4.

U.S. Pat. No. 5,837,897 generally discloses a method and apparatus for testing inflated vehicle tires to determine internal physical characteristics such as tire pressure. The apparatus includes a waveform transceiver that subjects a tire to be tested to a transmitted waveform. The transceiver also transmits an ultrasonic waveform from a location external to the tire under test. Additionally, the transceiver receives the ultrasonic waveform from a tire under test at a location external thereto. A processor is provided for interpreting the received waveform with reference to the decay or attenuation of the amplitude of the waveform with time to provide a measure of the internal physical characteristic. Thus, a vehicle tire testing apparatus is disclosed having an ultrasonic transducer 14 external to the wall 28, a processor and a display 29, as more fully shown in FIGS. 1, 5 and 6; Col. 4, Line 6 to Col. 5, Line 26 and Claims 1-5.

U.S. Pat. No. 5,117,835 generally discloses a method and apparatus for non-invasively measuring changes in intracranial pressure (ICP) in a patient's skull which allow trends in such pressure to be diagnosed over time. A generation of a predetermined vibration signal is applied to a first location on a skull. An output vibration from another location on the skull is detected. Data characteristics of the two signals are stored. These steps are repeated and the data is analyzed to diagnose changes in ICP over time.

U.S. Pat. No. 4,996,516 generally discloses an indicating device adapted to indicate a severely underinflated tire. The device is activated by the enlargement in the diameter of the underinflated tire caused by centrifugal force acting on the tread, and may be especially useful on dual wheels, although it will work on others as well. The device includes a contact device which is contacted by an expanding tire. That contact tilts a switch to cause a circuit to be completed to light a signal lamp in the cab of the truck.

U.S. Pat. No. 4,630,470 generally discloses apparatus and a method for determining the tire pressures of vehicles as they pass an instrumented checkpoint on a roadway. Rigid corrugations on the roadway set the tires into vibration with a waveform which is a function of tire pressure. The complex waveforms from each tire of a given vehicle are subjected to a spectral analysis and the results of such analyses are compared to each other to determine which, if any, of said tires have produced a spectrum different from the normal spectra produced by the other tires. Thus, no apparatus mounted on the vehicles is being checked. A vehicle tire 19 pressure sensor 25 has energy impulse means which are instrumented to produce mechanical vibration wave forms. A processor 29 to measure the tire pressure is disclosed, as shown in FIGS. 2-5; Col. 3, Line 23 to Col. 5, Line 32; Col. 6, Lines 1-22 and Claims 1 and 5-6.

U.S. Pat. No. 4,479,386 generally discloses a method and a system for testing the bonding of foam insulation (22) attached to metal. The system involves the use of an impacter (10) which has a calibrated load cell (12) mounted on a plunger (14), and a hammer head (16) mounted on the end of the plunger (14). When the impacter (10) strikes the insulation (22) at a point to be tested, the load cell (12) measures the force of the impact and the precise time interval during which the hammer head (16) is in contact with the insulation (22). This information is transmitted as an electrical signal (20) to a load cell amplifier (28) where the signal (20) is conditioned and then transmitted to a Fast Fourier Transform (FFT) analyzer (34). The FFT analyzer (34) produces energy spectral density curves (power plotted against frequency in Hertz) which are displayed on a video screen (39). An operator, by observing the frequency point at which the curve terminates, may determine the quality of the bond. Specifically, the termination frequency of the energy spectral density curve may be compared with a predetermined empirical scale to determine whether a high quality bond, good bond, or debond is present at the point of impact. For future reference and use, data from the FFT analyzer (34) are recorded on a magnetic disk (41) and/or a hard copy is produced by a printer (43) system.

U.S. Pat. No. 4,089,226 generally discloses a residual tire life prediction system. The system uses a clock to trigger a bang generator that provides pulses of electrical energy to a pulse-echo transducer. The transducer converts pulses of electrical energy to pulses of ultrasonic vibration. The transducer is located on the tread of a steel belted tire to transmit pulses of ultrasonic energy into the tire and to receive reflected ultrasonic energy from plies of the tire casing. The transducer converts the reflected ultrasonic energy to provide bursts of electrical signals. The transducer is connected to a time varying gain control circuit that has its output connected via a full-wave rectifier to a first gate and to an input of a voltage level detector. The clock is also connected to a first time-delay circuit that is operative after a delay, subsequent to the pulse of the bang generator, to enable a second gate. This is connected to the output of the voltage level detector that provides a signal when it receives the signal based on the reflection from the outer steel belt. This is relayed to a second time-delay circuit that provides an enable signal at its output after a predetermined delay for a predetermined period of time to the first gate. This opens the first gate for passage of signals from the rectifier to a peak sensing device that provides an output signal to a digital panel meter for display of the value of the maximum amplitude passing through the first gate. Thus, the system includes a pulse-echo transducer 11, bang generator 17 and amplifier circuit 20 as shown in FIGS. 1 and 2; Col. 6, Line 31 to Col. 8, Line 41, and Claims 1-5 and 17.

U.S. Patent Application Publ. No. 2002/0038570 generally discloses a compact, robust, and inexpensive magnetically coupled pressure gauge. The gauge includes a spiral-faced or helical bellows coupled for rotating a magnetic field source (permanent magnet) within a pressure vessel. The orientation of the magnetic field is externally sensed and correlated to pressure within the pressure vessel. Applications contemplated include measuring pressure in pressure vessels and pressure of pneumatic vehicle tires without breaching the integrity of the particular pressurized vessels. Embodiments included a visual, manual tire pressure monitoring system.

U.S. Patent Application Publ. No. 2009/0315694 generally discloses a piezoelectric triggering mechanism (10) includes a piezoelectric element (12), such as the transducer of a SAW device, that is configured to crack or break upon being subjected to excessive levels of mechanical force or other triggering mechanisms, thus generating a burst of electromagnetic energy. The large impulse of energy can then be conditioned (14) through resonant circuits or antennae and modulated (16) with an identification pattern through appropriate structures (such as SAW electrodes) to send a breakage indication signal to a remote receiver (18). Piezoelectric elements (12) may be integrated with a pneumatic tire structure to provide indication upon pressure loss or tire failure. Piezoelectric elements (12) may also be integrated with safety support features of some tire structures to provide indication of tire operation in a run-flat mode of operation. Related aspects of the present piezoelectric triggering technology employ a piezoelectric element (12) in a trigger detection method, which may involve detection of such occurrences as breach of security via opening of a sealed access structure or breakage of a glass panel, deployment of an airbag, loss of pressure or excess deflection in a tire, presence of smoke in a given location, and other rupture and sensor applications.

U.S. Patent Application Publ. No. 2010/0089161 generally discloses methods to assess damage on a joint. These include energizing the joint, detecting the vibration of the joint using one or more signal generating sensors, processing the signal(s), and applying a damage index to the processed signal(s). The damage index incorporates a processed control signal generated by a sensor(s) at or near the joint when the joint was healthy, i.e., in a substantially undamaged state. In another embodiment, a pipeline having at least two pipe segments and at least one joint connecting the two pipe segments is provided. At least one signal generating sensor is affixed to the pipeline and is capable of detecting vibration at or near the joint. At least one signal processor capable of EMD processing the signal is provided. An output device (e.g., computer monitor, LED display, a light bulb, an electronic alarm, or other sound or light generating device) is provided. Thus, a piezoelectric sensor with accelerometer capable of detecting an impulse hammer measurable response is disclosed, as described in FIGS. 1-3; Paragraphs [0011]-[0025], [0081]-[0082] and Claims 1, 15, 21 and 27.

Thus, a problem associated with devices that precede the present disclosure is that they do not provide, in combination with the other features and advantages disclosed herein, a tire pressure measuring system that is self-contained and may be conveniently used by a single operator, without special devices or sensors attached to the tire or a need to analyze data obtained from these devices or sensors, as is done in typical modal analyses, in order to determine the tire pressure.

Yet another problem associated with devices that precede the present disclosure is that they do not provide, in combination with the other features and advantages disclosed herein, a tire pressure measuring system that does not require special modification of the roadway to measure tire pressure.

Still a further problem associated with devices that precede the present disclosure is that they do not provide, in combination with the other features and advantages disclosed herein, a tire pressure measuring system that does not require access to, or even location of, the tire valve as is required when using pencil type, digital strain type or Bourdon tube type gauges.

An additional problem associated with devices that precede the present disclosure is that they do not provide, in combination with the other features and advantages disclosed herein, a tire pressure measuring system that does not require special devices or sensors mounted on the vehicle, the vehicle wheel well, the vehicle wheel, or the tire.

Another problem associated with devices that precede the present disclosure is that they do not provide, in combination with the other features and advantages disclosed herein, a system to measure tire pressure that provides precise pressure data rather than reporting simply if the tire is sufficiently inflated or not.

An even further problem associated with devices that precede the present disclosure is that they do not provide, in combination with the other features and advantages disclosed herein, a tire pressure measuring system that is impervious to damage from road conditions upon which the vehicle rests or travels.

Still another problem associated with devices that precede the present disclosure is that they do not provide, in combination with the other features and advantages disclosed herein, a tire pressure measuring system that insensitive to ballast that may be in the tire, for instance that which is often found in tires used for agricultural applications.

A yet further problem associated with devices that precede the present disclosure is that they do not provide, in combination with the other features and advantages disclosed herein, a tire pressure measuring system that is simple to calibrate for a variety of types and sizes of pneumatic tires.

And yet another problem associated with devices that precede the present disclosure is that they do not provide, in combination with the other features and advantages disclosed herein, a tire pressure measuring system that does not require seating it on a tire valve.

A still further problem associated with devices that precede the present disclosure is that they do not provide, in combination with the other features and advantages disclosed herein, a tire pressure measuring system that provides excellent display resolution and is easy to read.

A further problem associated with devices that precede the present disclosure is that they do not provide, in combination with the other features and advantages disclosed herein, a tire pressure measuring system that provides accurate and precise pressure reading over a wide range of pressures.

Another problem associated with devices that precede the present disclosure is that they do not provide, in combination with the other features and advantages disclosed herein, a tire pressure measuring system that does not require a precise impulse to yield a precise measure of tire pressure, merely an impulse that is within the range usually associated with an impact by a hand-held hammer.

There is a demand, therefore, to overcome the foregoing problems while at the same time providing a tire pressure measuring system that is simple and rapid to use by a single operator, while being self-contained and yielding precise and accurate values of tire pressure.

SUMMARY OF THE INVENTION

In a preferred embodiment, the tire pressure measuring system disclosed herein provides a hand-held instrumented hammer used to strike a tire, either on the sidewall or on the tread area, said instrumented hammer being provided with either or any combination of onboard acceleration sensors, force sensors and tire contact sensors. Said instrumented hammer is also provided with either an onboard data processor or an onboard system to transmit data to a remote data processor. Said data processor then conditions and analyzes the signal from said acceleration sensor, force sensor or tire contact sensor and calculates said tire pressure.

In a more preferred embodiment, said hand-held instrumented hammer is provided with an output device that is capable of providing the operator of said instrumented hammer with any of or a combination of colored lights, an alphanumeric display or with an audible signal indicating the tire pressure.

Thus, it is an object of the present disclosure to provide, in combination with the other features and advantages disclosed herein, a system for tire pressure measurement that measures tire pressure without requiring that the tire be provided with, or have mounted upon it, any special equipment such as sensors or read-out devices or the need to perform complicated analyses of data from such an instrumented tire, as is done in typical modal analyses.

An additional object of the present disclosure is to provide, in combination with the other features and advantages disclosed herein, a system for tire pressure measurement that does not require the vehicle upon which the tire is mounted to be driven on a specially modified roadway.

Still a further object of the present disclosure is to provide, in combination with the other features and advantages disclosed herein, a system for tire pressure measurement that is operated by one person without need to open, access or even locate, the valve stem in order to accurately measure tire pressure.

A further object of the present disclosure is to provide, in combination with the other features and advantages disclosed herein, a system for tire pressure measurement that measures tire pressure without requiring that the vehicle, tire, wheel or the vehicle wheel well be provided with, or have mounted upon it, any special devices or sensors and therefore there is no need to condition or analyze any data associated with the vehicle or vehicle wheel well.

Yet another object of the present disclosure is to provide, in combination with the other features and advantages disclosed herein, a system for tire pressure measurement that is capable of accurately measuring and reporting the actual pressure in a tire, rather than simply report whether the pressure in the tire exceeds a certain minimum value.

Still a further object of the present disclosure is to provide, in combination with the other features and advantages disclosed herein, a system for tire pressure measurement that is impervious to damage from road conditions upon which the vehicle rests or travels.

Another object of the present disclosure is to provide, in combination with the other features and advantages disclosed herein, a system for tire pressure measurement that measures tire pressure that is not sensitive to ballast in the tire, such as that often found in tires used for agricultural applications.

An even further object of the present disclosure is to provide, in combination with the other features and advantages disclosed herein, a system for tire pressure measurement that is simple to calibrate for a range of tire types.

A further object of the present disclosure is to provide, in combination with the other features and advantages disclosed herein, a system for tire pressure measurement that does not need to be seated on the tire valve.

A yet further object of the present disclosure is to provide, in combination with the other features and advantages disclosed herein, a system for tire pressure measurement that provides excellent display resolution and is easy to read.

Still another object of the present disclosure is to provide, in combination with the other features and advantages disclosed herein, a system for tire pressure measurement that provides precise and accurate pressure readings over a wide range of pressure.

Another object of the present disclosure is to provide, in combination with the other features and advantages disclosed herein, a system for tire pressure measurement that does not require a precise impulse, merely an impact within the range usually achievable by a person hitting an object with an ordinary hand-held hammer, in order to accurately measure the pressure in the tire.

The following disclosure provides a system for tire pressure measurement that provides the foregoing advantages while at the same time is simple and rapid to operate while providing accurate values of tire pressure.

BRIEF DESCRIPTION OF THE DRAWINGS

In the detailed description that follows, reference will be made to the following figures.

DETAILED DESCRIPTION OF PREFERRED EMBODIMENTS

Introduction

Figure 1:
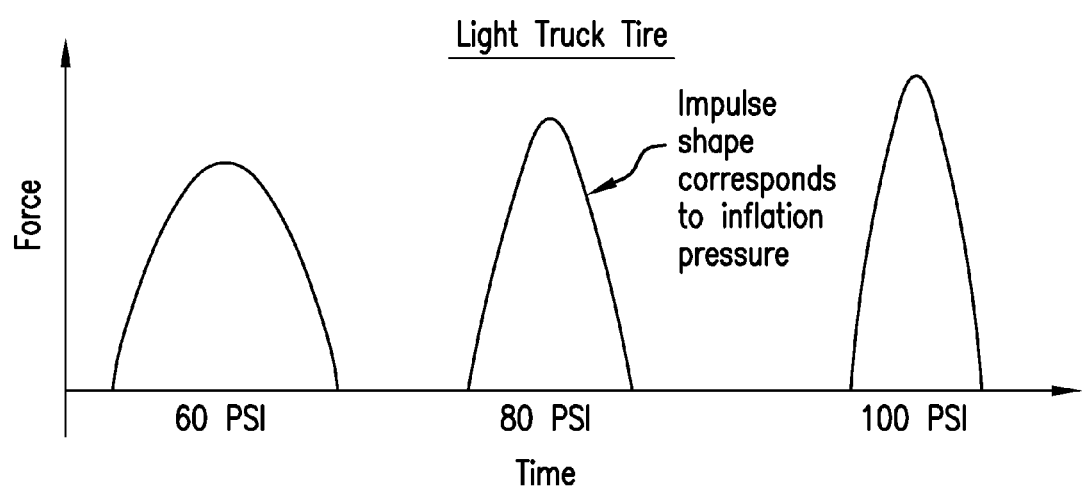
FIG. 1 illustrates anticipated impulse response data for the same tire held at three different tire pressures with comparable hammer blows.

An apparatus and method for fast and accurate tire pressure measurement is disclosed. In a preferred embodiment, the disclosed apparatus is an instrumented hammer sized to be hand-held. The instrumented hammer can accurately measure tire pressure by hitting the tread or sidewall of the tire. The apparatus includes an instrumented weighted head which records the acceleration or force versus time during impact. This data is analyzed with a processor and is used to calculate the corresponding tire pressure. The pressure is output via an alphanumeric display, or lights or an audible signal or an analogue read out.

In a more preferred embodiment, the on-board processor contained in the handle of the instrumented hammer is provided with a calibration used to calculate the pressure of the tire from the hammer impulse during impact.

Another feature that can be incorporated in a yet more preferred embodiment is to provide the instrumented hammer with an input device such that information, such as type of tire can be input into the on-board processor. Preferably, the on-board processor contained in the handle of the instrumented hammer is provided with a library of calibrations for different types of tire which are used to calculate the pressure of the tire from the impulse during impact. The type of tire is input into the on-board processor so that the correct calibration is used for calculation.

The instrumented hammer can be further provided with a wireless transmitter that transmits the data collected during the impact with the tire to a remote wireless base station. A processor, contained in the remote wireless base station is provided with calibration data used to calculate the pressure of the tire from the data gathered during impact. This wireless base station is provided with the means to output the tire pressure via an alphanumeric display, or lights or an audible signal or an analogue readout. The remote wireless base station can further be provided with an input device such that information, such as the type of tire being measured, can be inputted into the processor contained in the remote wireless base station. The processor can be provided with a library of calibrations for different types of tires which are used to calculate the pressure of the tire from the impulse during impact. The type of tire is input into the processor contained in the wireless remote base station so that the correct calibration is used for calculation.

Principles of Operation

An instrumented hammer is provided for striking a tire, whereupon instrumentation either onboard the hammer or wirelessly transmitted to a remote wireless receiving base station measures the force as a function of time during the strike.

A highly inflated tire will behave as a relatively stiff object with a correspondingly high effective spring rate in response to a deflection. In contrast, a tire that is less inflated is correspondingly less stiff, and thus has a lower spring rate in response to the same deflection. Thus, if the instrumented hammer imparts an impulse to a relatively more inflated tire, the impulse imparted to that more inflated tire will be of shorter duration with a higher peak force than the same impulse imparted to a tire that is less inflated.

Instrumentation onboard the hammer is provided that measures the force over time as it strikes the tire. Typically the hammer is equipped with an acceleration sensor or a force sensor that is mounted in line with the striking face of the hammer.

Mechanical Impulse, as defined by the integrated form of Newton's 2nd law known as the Impulse-Momentum form, is defined by the equation ∫Fdt, the integral of force over time. This quantity corresponds to the change of linear momentum $\Delta G$, or $m\Delta v$ of the object of interest, which is the instrumented hammer of the preferred embodiment.

FIG. 1 shows three hypothesized blows of equal intensity (same impulse) onto the same tire at three different inflation pressures. Impulse values are hypothesized to remain invariant; impulse shapes are hypothesized to change. Note that the impact to the higher inflation tire results in a higher peak force, but for a shorter duration of time compared to the impact to the same tire at a lower inflation pressure. This is because the lower inflation tire has lower stiffness and therefore has a lower peak force, but the force is spread out over more time in order to cause the same reversal of momentum for the hammer. In simple terms, the hammer rebounds more slowly when striking the softer tire at the same force.

In each impact, the mechanical impulse value, the integral of force with respect to time is equal. Higher peak forces compensate for shorter duration, and longer duration impacts have lower peak force values. It is necessary to understand the distinction being made here between the shape of the impulse, which broadly can be characterized by its width (time duration, measured in seconds or milliseconds) and its height (maximum force, measured in pounds force, lbf), and the value of the impulse, which is merely the arithmetic number that describes the area under the curve, and is measured in units of lbf-seconds.

It is important to note that if the tire carcass behaves as a thin membrane with negligible hysteresis, i.e. no energy is stored or wasted during the blow, the change in momentum of the hammer, and therefore the total mechanical impulse value, will be the same for equal intensity hammer blows even at different tire pressures.

Example 1

Figure 2:
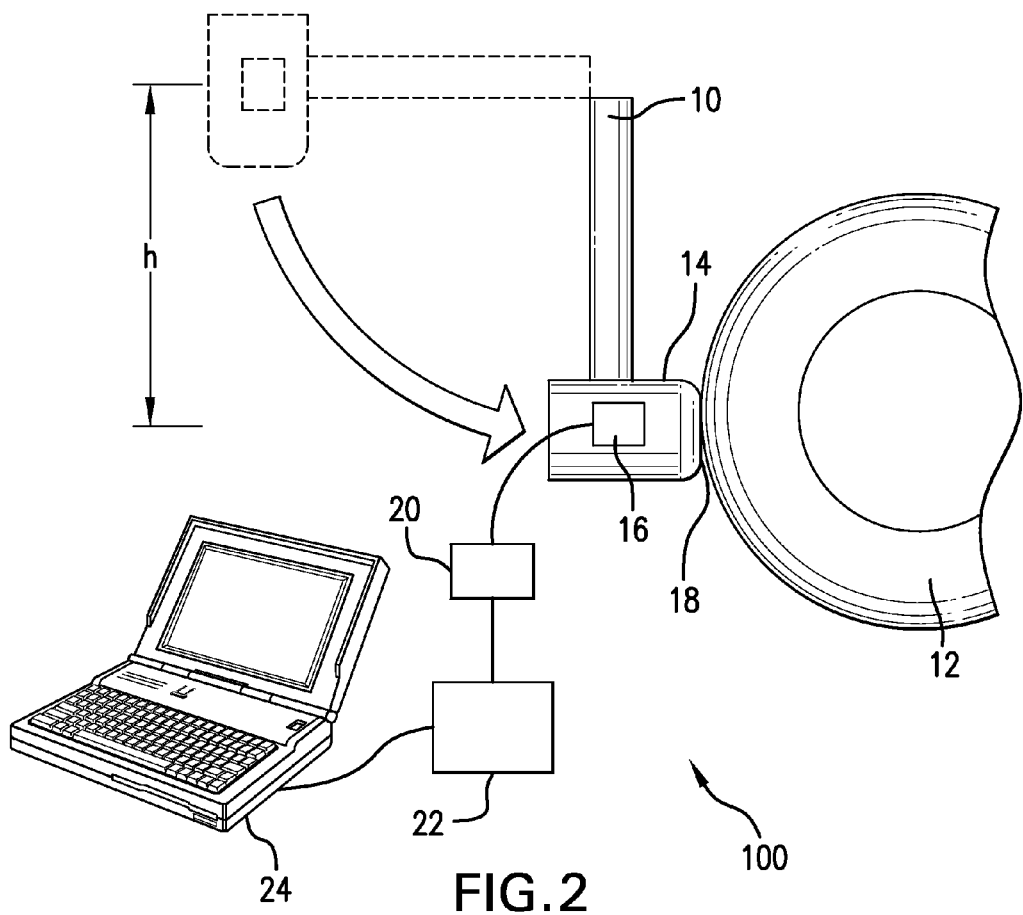
FIG. 2 is a schematic illustration of a calibration apparatus for use in a first preferred embodiment of the disclosure.

To test the hypothesis that equal intensity blows to tires at different pressures will yield the same Mechanical Impulse Value (MIV), but with clearly differentiable impulse shapes, the following tests were conducted. Referring to FIG. 2, a schematic of the calibration apparatus 100 of a first preferred embodiment is shown. A unicycle tire 12 was inflated to three different pressures. At each pressure, the same uniform hammer blow was imparted to the tire 12 by raising an impulse hammer 10 to a fixed initial height, h, and allowing it to swing, pendulum-like, into the tire.

Figure 3:
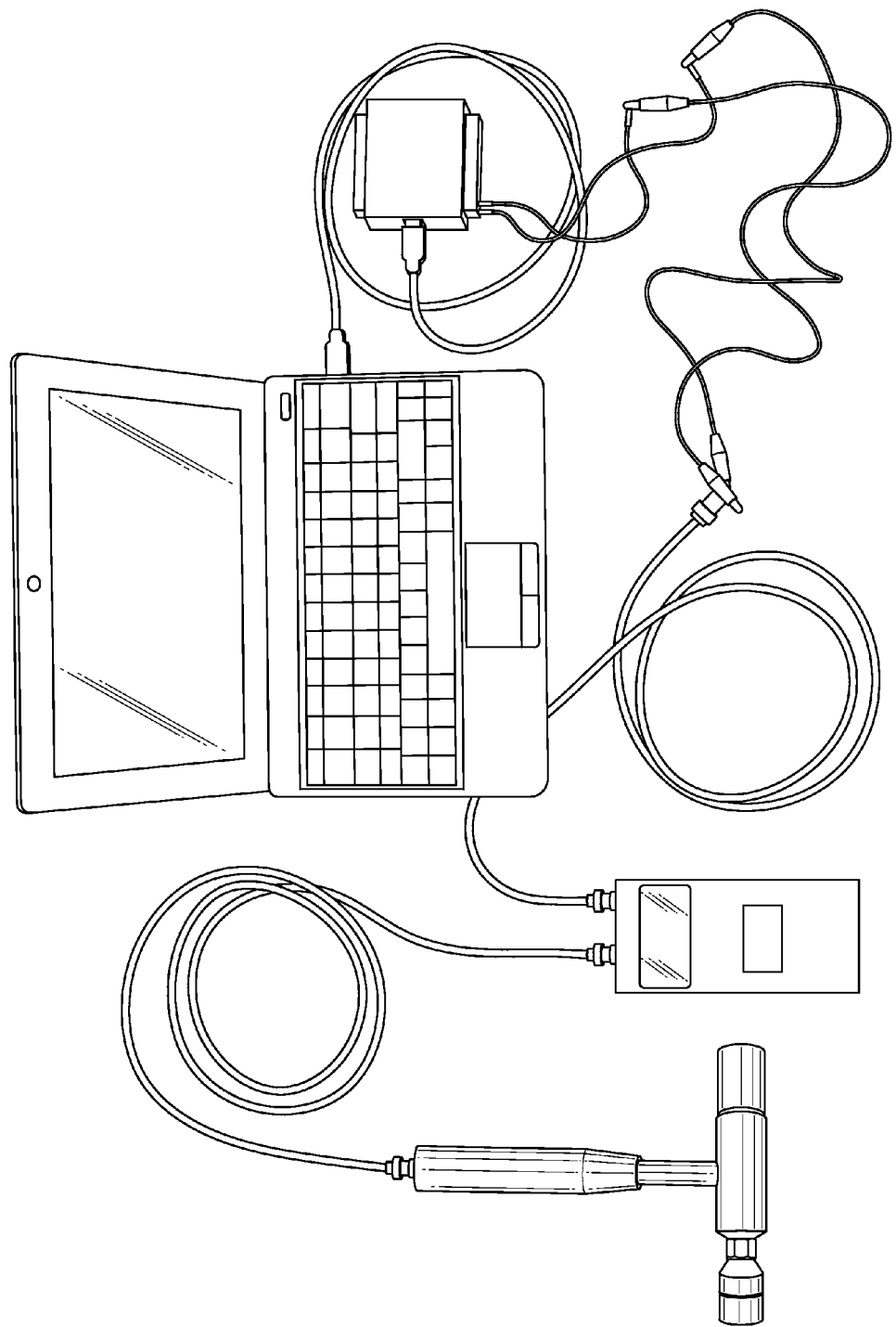
FIG. 3 is an illustration of data acquisition and processing equipment for use in the first preferred embodiment of the disclosure.

The small impulse hammer 10, PCB brand, Model 086B03, 8 kHz frequency range, 333 Hz range, 5V output, weighted to 300 grams was used to strike the unicycle tire 12. The impulse hammer 10 has a head 14 equipped with a force sensor 16 which is located in line with a striking face 18 of the hammer 10. The impulse hammer 10 was powered by a PCB brand Model 482M70 I.C.P. power supply/charge amp 20. Data was acquired from the force sensor 16 at 1.2 kHz using an A/D converter data acquisition system 22 [MicroDAQ brand, Model USB-1208LS], transferred to a personal computer 24 and analyzed with MATLAB® (Version R2010b) software to analyze the mechanical impulse of the instrumented hammer 10 striking the tire 12 at a known pressure. FIG. 3 is an illustration of an impulse hammer and data acquisition system similar to that used in this Example.

The mechanical impulse was analyzed from the data as follows:

First, raw data, in the form of observation number vs. voltage is acquired from the force sensor 16, which is located in line with striking face 18 of instrumented hammer 10. Next, the observation number is converted to time, using the data acquisition collection frequency of 1.2 kHz. This voltage signal is searched for periods where it is invariant. These data are used as zero values and are subtracted from the voltage signal data to correct for any bias in the recorded data. The voltage signal is then converted to force in units of pounds force, lbf, using the appropriate hammer sensitivity value.

The force data, which have been corrected for any bias, are searched for a maximum value which is defined as the peak value of the impulse. Then, the impulse length is found by first searching the force data forward and backward from this peak value location, for the impulse start and end by scanning for the first crossing at a search threshold which is set at an appropriate value, ranging from 1-6 lbf. These time values for the start and end of the blow to the tire are stored and the time value for the start of the blow to the tire is subtracted from the time value of the finish of the blow to the tire and the result is stored as the duration of the impulse. The force vs. time curve for the blow to the tire is integrated from the start time to the finish time, using Simpson's rule, yielding the mechanical impulse value (MIV) in lbf-sec for that particular tire pressure and that particular hammer blow.

Figure 4:
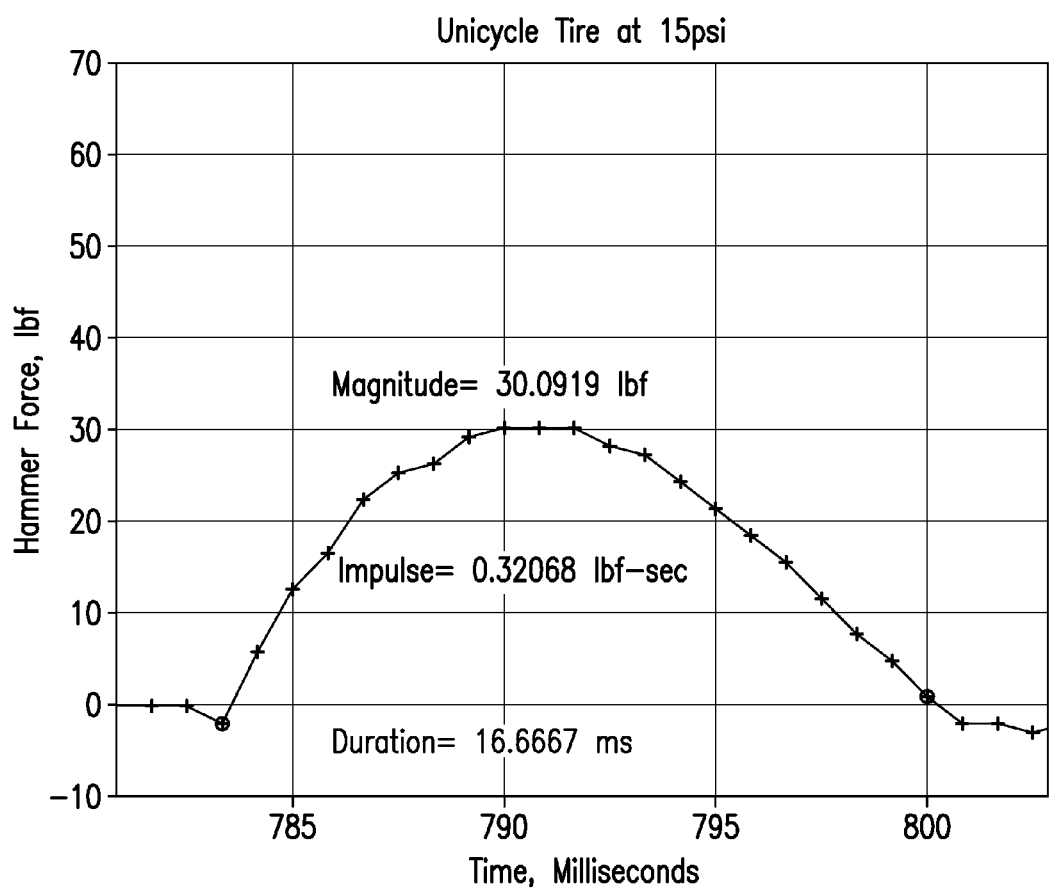
FIGS. 4, 5 and 6 illustrate unicycle tire response data used for calibration showing force as a function of time for three different tire pressures for a tire that is struck by an instrumented hammer of the first preferred embodiment.
Figure 5:
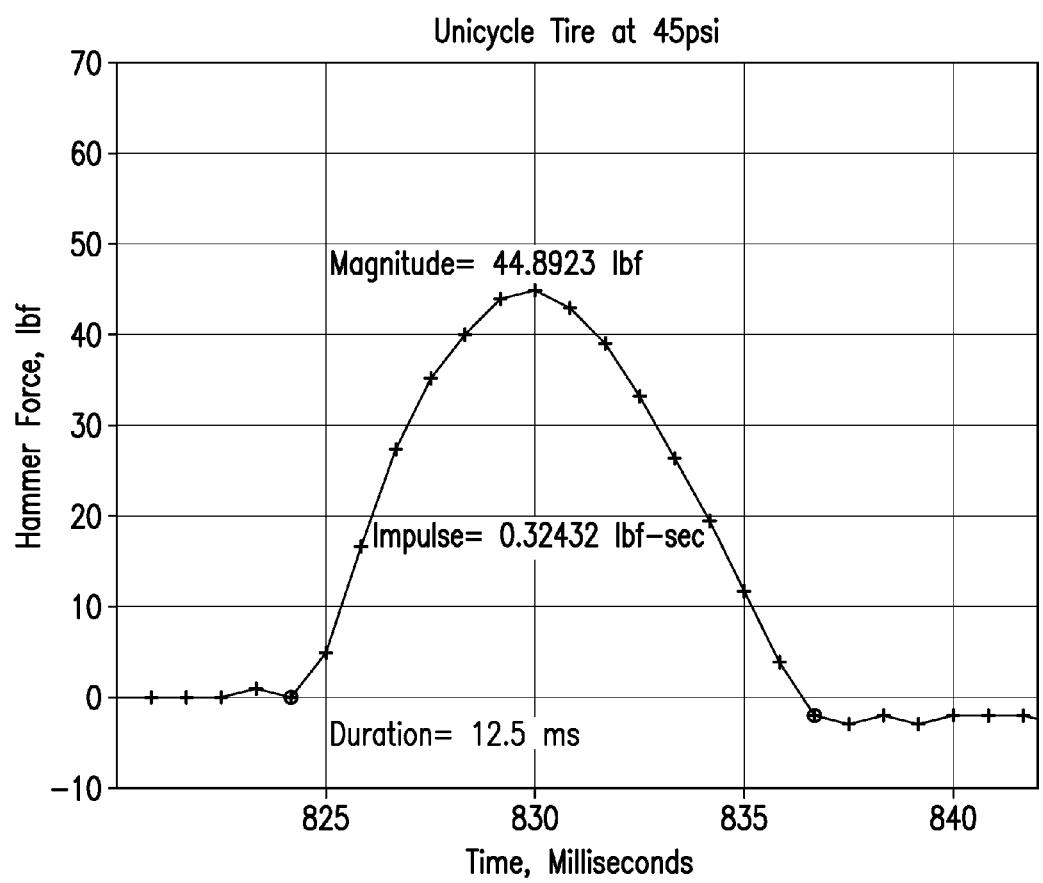
Figure 6:
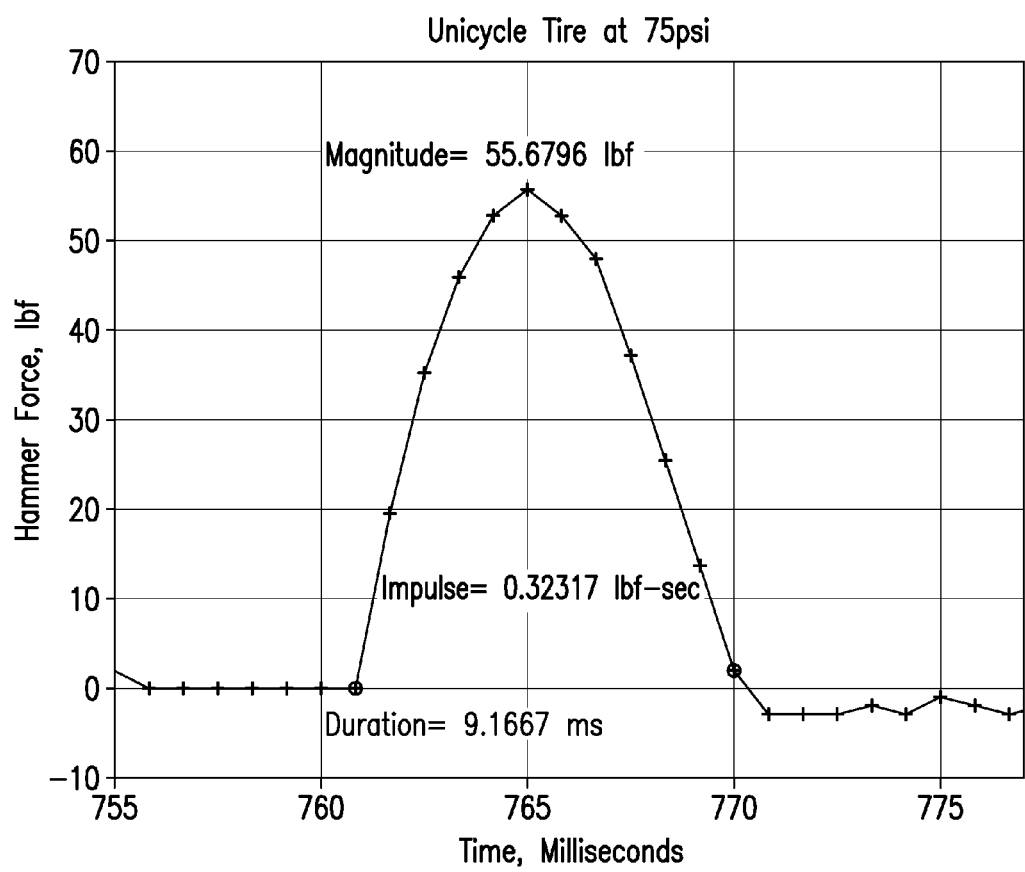

FIGS. 4, 5 and 6 depict the force as a function of time on three tires at 15, 45 and 75 psi, respectively. The same hammer blow was applied to each tire, FIGS. 4, 5 and 6 show that the mechanical impulse value (integral of force with respect to time) is not a function of tire pressure; the value was approximately 032 lbf-sec for each different pressure and each hammer blow.

Thus, the hypothesized tire response depicted in FIG. 1 was found to be supported by test data. Hysteretic losses did not differentially affect different tires held at different pressures, and impulses changed shape, but not value, at different tire pressures.

Example 2

Next, a procedure was devised and followed to determine the relationship between tire pressure, peak force and impact duration, to use for calibration of the first preferred embodiment. FIGS. 4, 5 and 6 confirm that the shape of the impulse curve is a function of tire pressure. As tire pressure is increased, the duration of the impact is decreased and the peak force is increased. These relationships, using the data from FIGS. 4, 5 and 6, are shown in FIG. 7.

Figure 7:
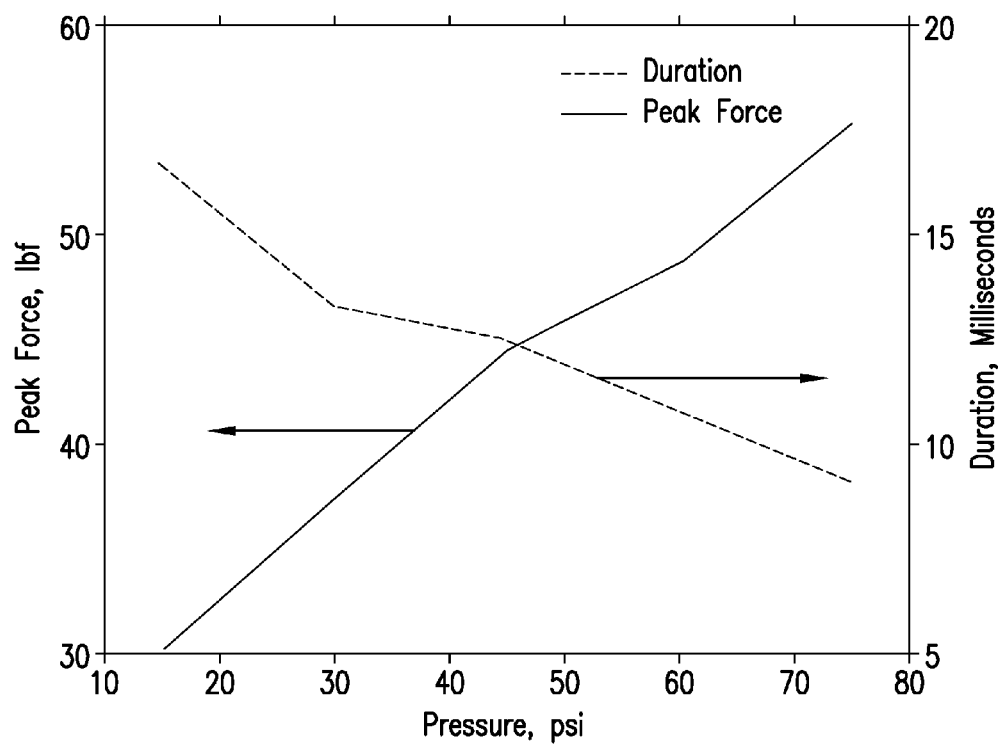
FIG. 7 illustrates calibration data relating peak force and impulse duration as a function of tire pressure using a known impulse of the first preferred embodiment.

FIG. 7 shows that the tire pressure can be obtained from either the peak force or the duration of the impact. However, a difficulty lies in the fact that the relationship is dependent upon the MIV that was imparted to the tire; a different relationship between peak force and duration of the impact would be expected to be obtained for a different MIV. Therefore, it is helpful to determine whether one can scale force versus time data obtained from an arbitrary MIV to the force versus time data obtained from the calibration MIV, and thereby derive a single calibration curve, such as FIG. 7, to determine the pressure in a tire from an arbitrary impulse.

A First Preferred Embodiment of an Instrumented Hammer

Example 3

To determine if a single calibration curve, such as FIG. 7, obtained with a single value of a calibrated impulse, can be used to accurately obtain pressure with a different MIV than that used for the calibration, the following procedure was followed.

Figure 8:
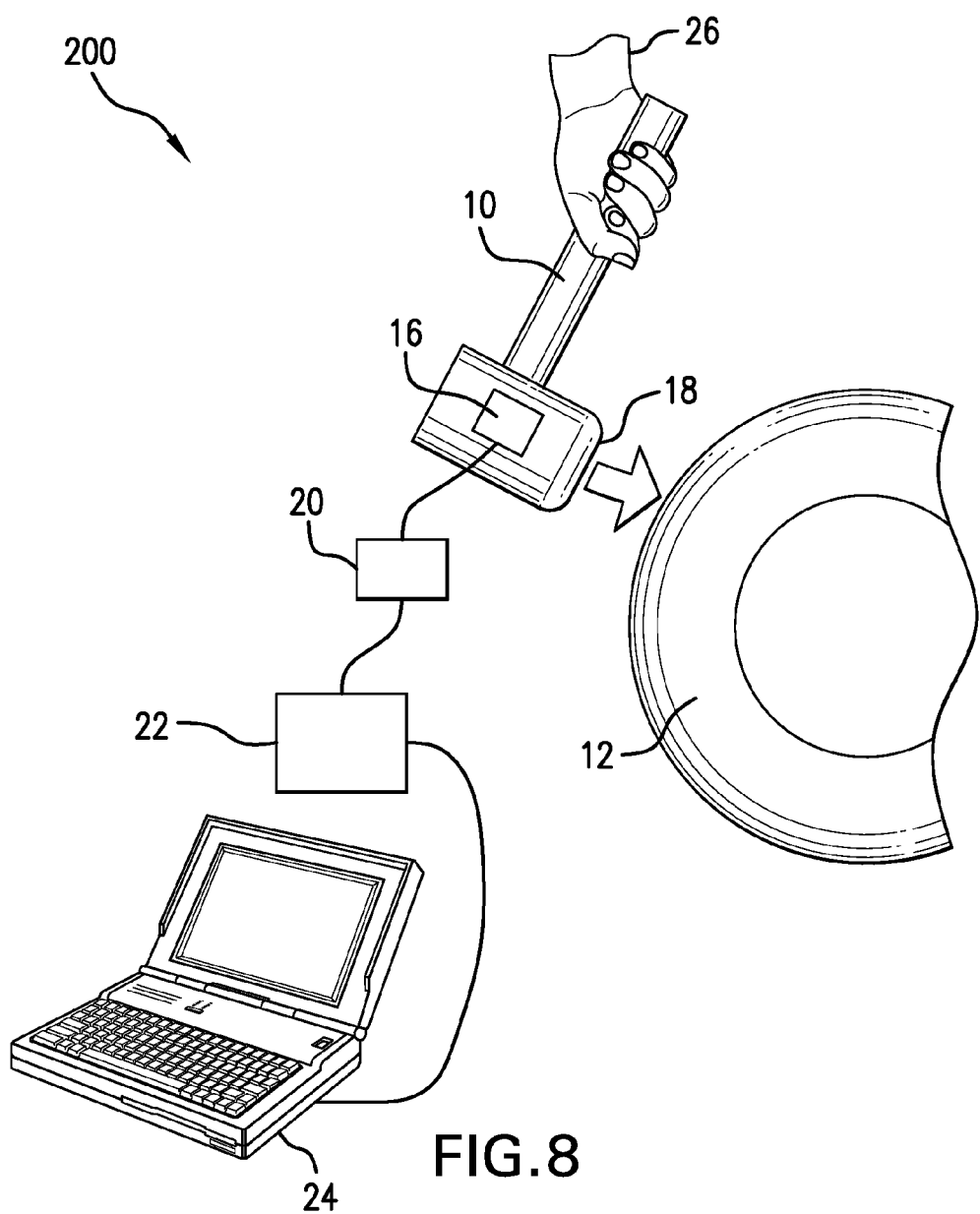
FIG. 8 is a schematic depiction of a test system of the first preferred embodiment in use by a human operator.

The apparatus for the test set-up is shown schematically in FIG. 8. FIG. 8 shows the first preferred embodiment in use by a human operator. The same type of unicycle tire 12 as was used in the calibration set up shown in FIG. 2 was held at a pressure of 40 psi, and struck with a series of blows, each having a different mechanical impulse value. This time, the instrumented hammer 10 was hand-held by an operator 26 and the unicycle tire 12 was struck at varying intensities by the operator 26. Force vs. time data was acquired for each blow. This data was acquired and integrated to obtain the mechanical impulse value in the same fashion as that described for the calibration in Example 2. This data is shown in FIGS. 9, 10 and 11.

Figure 9:
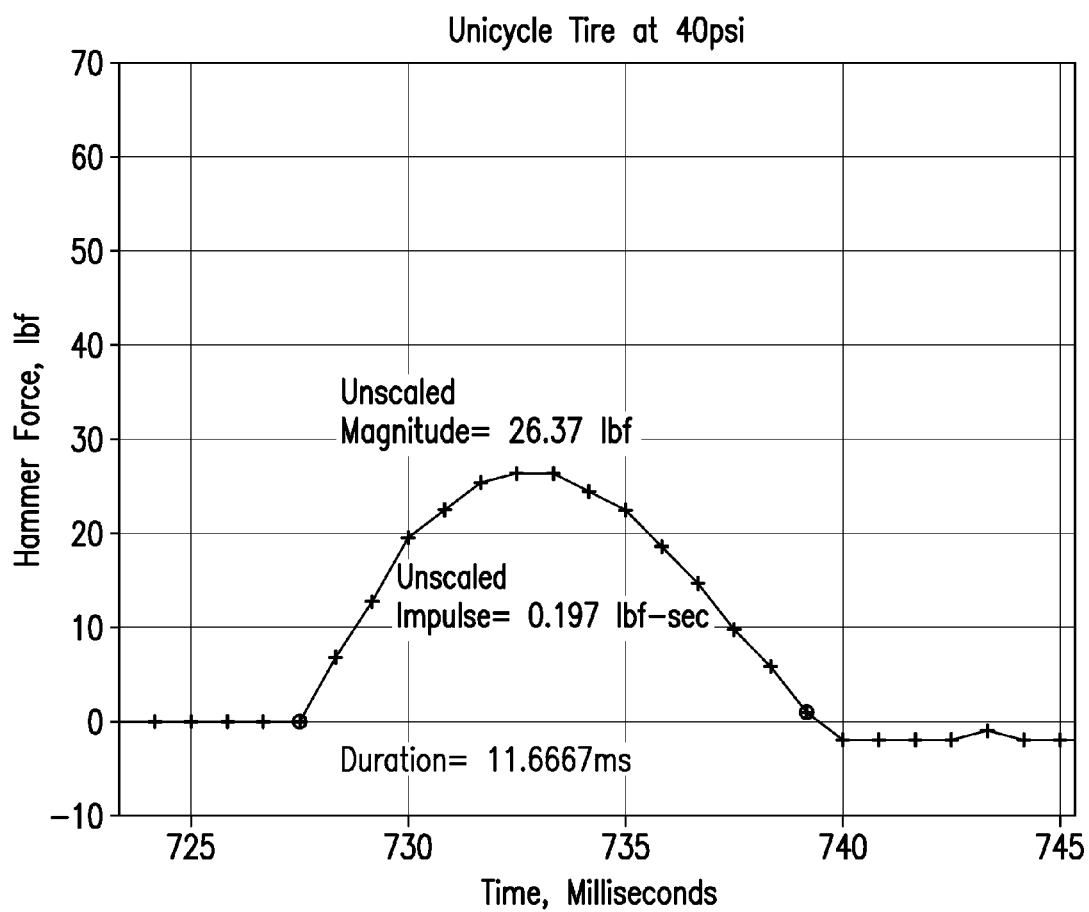
FIGS. 9, 10 and 11 illustrate data generated from the first preferred embodiment.
Figure 10:
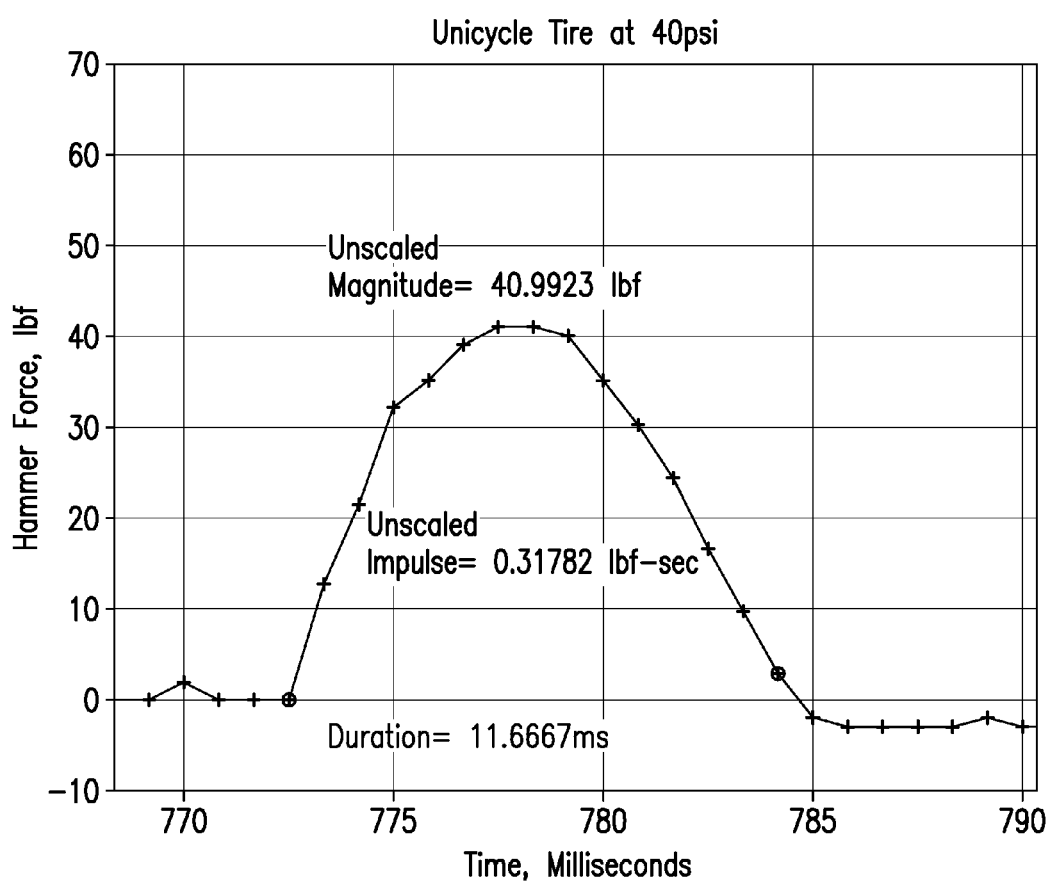
Figure 11:
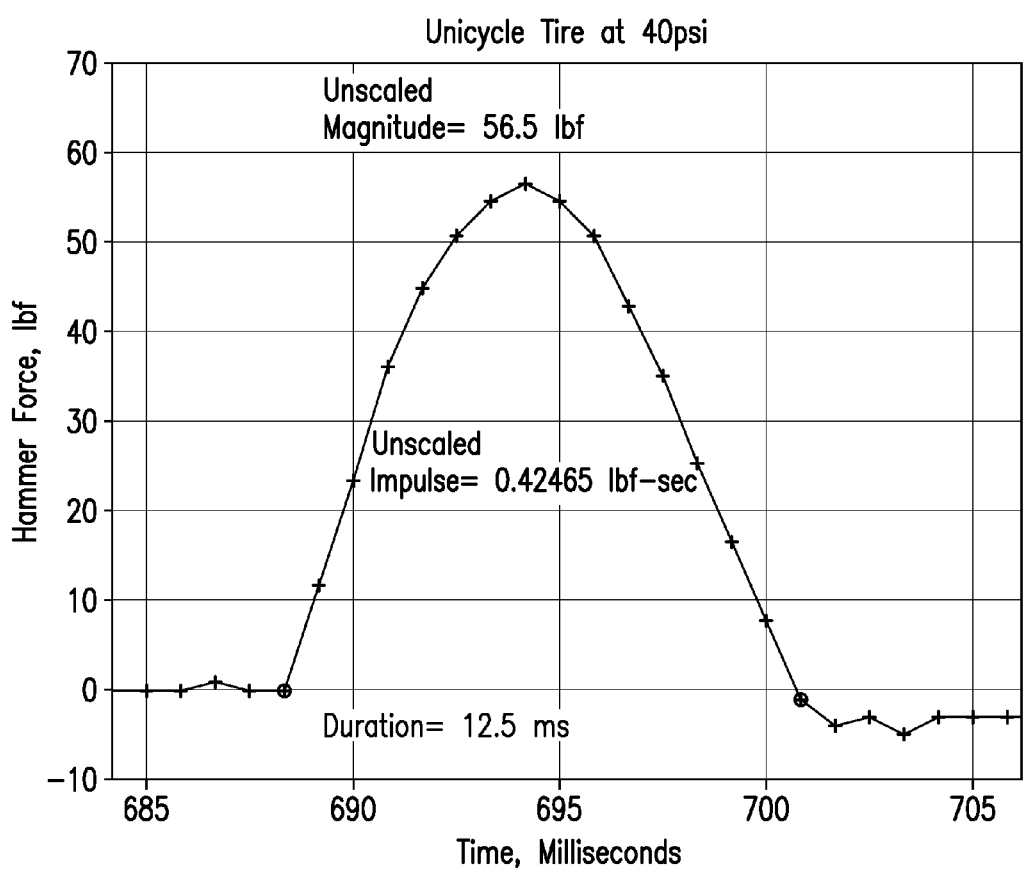

From FIGS. 9, 10 and 11, it is clear that each strike to the tire was different, since each yielded a different mechanical impulse value (area under the curve), ranging from 0.20 lbf-sec to 0.43 lbf-sec. This is most clearly apparent in the shape of the force vs. time curves, especially in the height of the curves, which is the peak force. The peak force for each blow ranged from 26.4 lbf to 56.5 lbf, for the three hammer blows shown in FIGS. 9, 10 and 11.

This experiment was repeated with tires held at 20, 35, 50, 55 and 60 psi. The results obtained at 40 psi are discussed here in greater detail, but similar results were obtained at higher and lower tire pressures.

Figure 12:
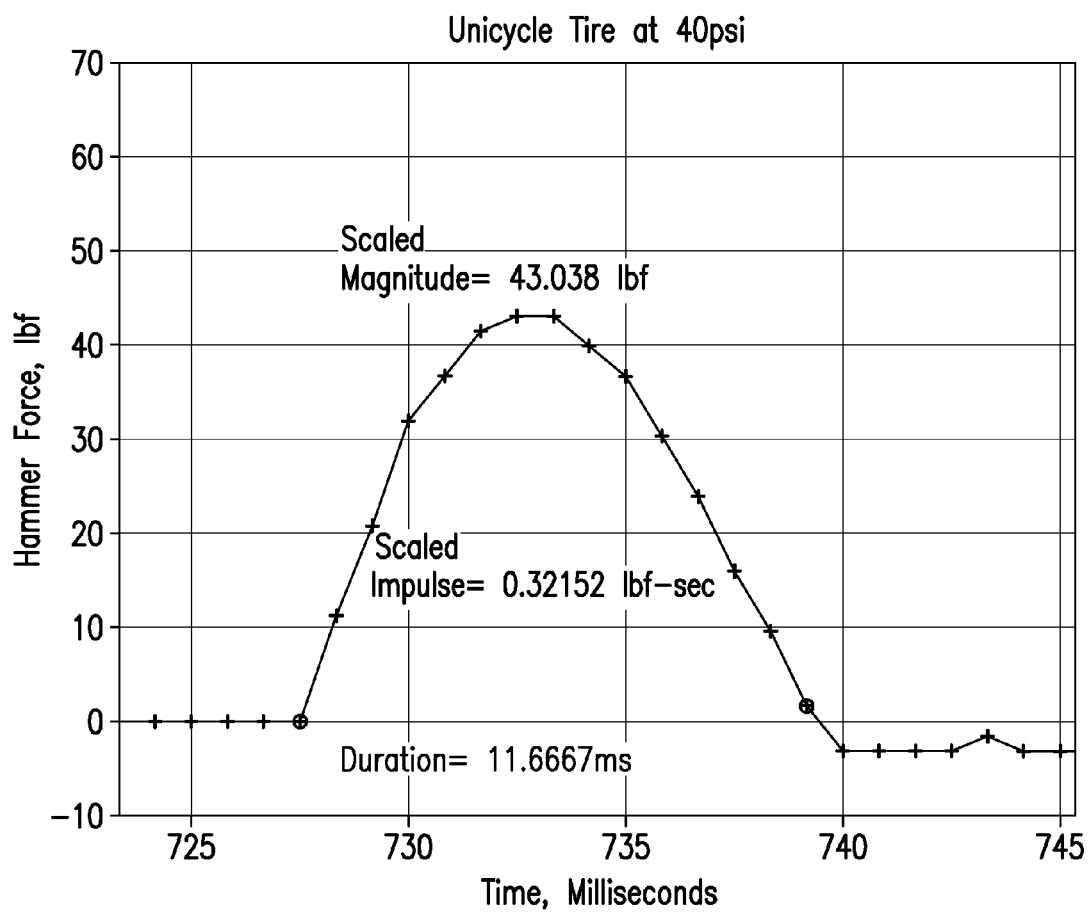
FIGS. 12, 13, and 14 illustrate scaled data correlative to the data shown in FIGS. 9, 10 and 11, respectively.
Figure 13:
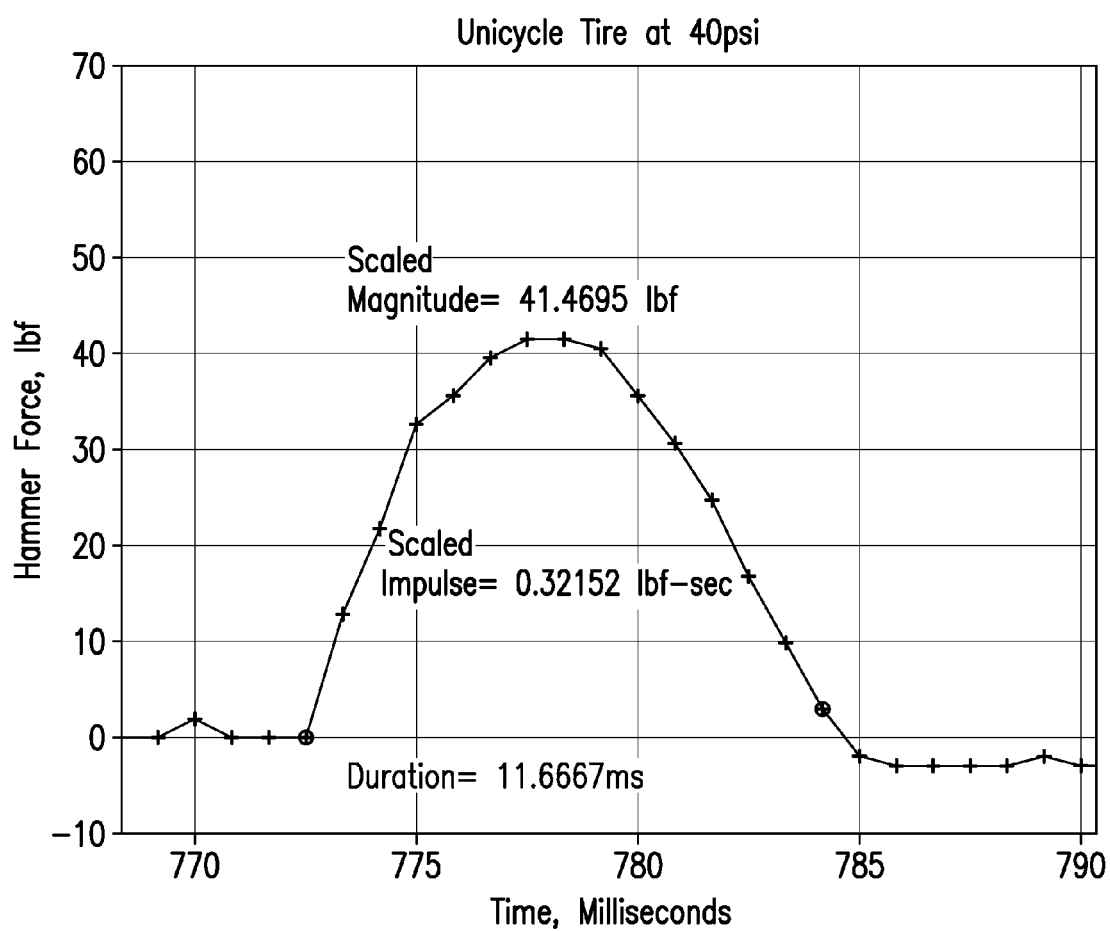
Figure 14:
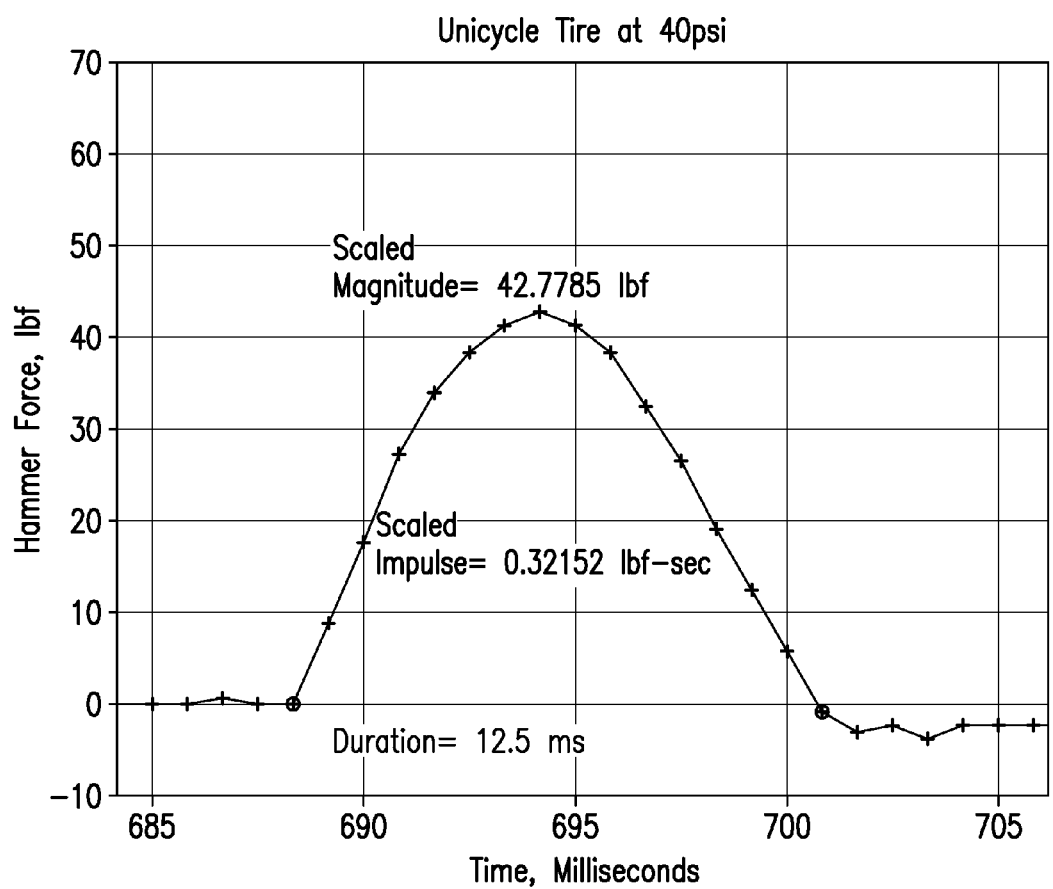

In order to use the calibration curve of FIG. 7, relating peak force to tire pressure at the calibration mechanical impulse value, $MIV_{calibration}$ of 0.32 lbf-sec, these data were scaled to $MIV_{calibration}$. This was done by multiplying each force value by the ratio of the actual mechanical impulse value for that data set to the $MIV_{calibration}$ value of 0.32 lbf-sec used for the calibration. The resulting scaled plots of force vs. time are shown in FIGS. 12, 13 and 14, for a tire held at 40 psi. This scaling method yielded excellent reproducibility of the mechanical impulse values for each tire pressure, which was not dependent on the intensity of the blow to the tire.

Unexpectedly, impact duration values were nearly invariant for a given inflation value, regardless of the magnitude of the hammer impulse. This behavior suggests that the tire pressure could be obtained only from the value of the impact duration and a calibration curve, such as shown in FIG. 7, using the curve relating tire pressure to impact duration, without requiring an analysis of force.

Table 1 shows the results in detail obtained for the unicycle tire held at 40 psi and subjected to different intensity hammer impulses.

TABLE 1

Unicycle tire pressure calculated from scaled Mechanical Impulse Values and calibration in FIG. 7, using curve for peak force and curve for impulse duration, 40 psi tire

| Actual mechanical impulse value, lbf-sec | Scaled mechanical impulse value, lbf-sec | Scaled peak force, lbf | Calculated pressure from peak force calibration, psi | Impulse duration (not scaled), ms | Calculated pressure from duration calculation, psi |
|---|---|---|---|---|---|
| 0.20 | 0.32 | 43.0 | 41.5 | 11.7 | 57 |
| 0.32 | 0.32 | 41.5 | 37.0 | 11.7 | 57 |
| 0.42 | 0.32 | 42.8 | 41.0 | 12.5 | 45 |

Similar results were obtained for tires pressurized to 20, 35, 50, 55, 65 psi. A subset of these results are summarized in Table 2:

TABLE 2

Summary of unicycle tire pressure measured with
instrumented hammer compared to actual unicycle
tire pressure, using FIG. 7 calibration for peak force
(using a medium intensity hand-held hammer blow)

| Actual unicycle tire pressure, psi | Unicycle tire pressure as measured using instrumented hammer and scaled peak force, psi |
|---|---|
| 20 | 20 |
| 35 | 31 |
| 40 | 42 |
| 50 | 51 |
| 55 | 50 |
| 65 | 63 |

Table 1 shows that while tire pressure is obtained more accurately using the scaled peak force as the calibration, the impulse duration values can also be used, together with a calibration such as shown in FIG. 7, to calculate tire pressure from a hammer blow, albeit with slightly less accuracy. These data suggest that there are two potential methods for measuring tire pressure using a hammer blow.

Scaled peak force, together with a calibration such as shown in FIG. 7, can be converted to pressure. The scaled peak force can be measured with an instrumented hammer equipped with a force sensor, as was done in Examples 1, 2 and 3. An instrumented hammer equipped with an acceleration sensor also can be used to produce values correlative to force and peak force, and therefore also could be used to determine tire pressure. Since tire pressure is also related to impulse duration, via a calibration such as shown in FIG. 7, it is clear that an instrumented hammer equipped with a contact sensor that measures the impact duration would also be capable of yielding tire pressure.

Calculating Pressure from Known $MIV_{Calibration}$

The following is a detailed description of method used for data acquisition and calculation of pressure from calibration obtained with known Mechanical Impulse Value $MIV_{calibration}$. Because tire pressure is found more accurately using scaled peak force, the following calculations performed on the force versus time data provide a pressure using the peak force of the hammer blow.

All calculations were performed in MATLAB® Version R2010b. Raw data, in form of observation number vs. voltage, is acquired from force sensor 16, which is located in line with striking face 18 of instrumented hammer 10 as shown in FIG. 8. The observation numbers are converted to time, by using the data acquisition collection frequency of 1.2 kHz.

The voltage signal is next searched for areas where it is invariant. These data are used as zero values and are subtracted from all the voltage signal data to correct for any bias in force sensor 16. The voltage signal is then converted to force in units of pounds force, lbf, by using the appropriate hammer sensitivity value. The force data, which have been corrected for any bias, are searched for a maximum value and this maximum value is stored. The data are searched forward and backward from this peak value location, for the impulse start and end by looking for a first crossing at a search threshold which is set at an appropriate value, ranging from 1-6 lbf. The time values corresponding to the start and end of the impulse are stored. The time value for the start of the impulse is subtracted from the time value of the finish of the impulse and the result is stored as the duration of the impulse.

This force vs. time curve for the impulse is integrated from the impulse start time to the impulse finish time, using Simpson's rule, which yields the mechanical impulse value in lbf-sec for that particular tire pressure and that particular hammer blow. The ratio of the uncorrected mechanical impulse value to the reference value of 0.32 lbf obtained from the calibration for that tire is calculated.

Then, each force value, from the beginning of the impulse to the end of the impulse is multiplied by this ratio to obtain scaled force values that will correspond to the $MIV_{calibration}$. This scaled peak force value is next compared to the calibration curve for that particular tire, such as FIG. 7, of peak force vs. tire pressure to yield the measured tire pressure.

To summarize: the steps taken to determine the pressure of a tire are as follows. First, the relation between the peak force and pressure for the particular type of tire is determined and stored. A typical such curve is as shown in FIG. 7. This can be done by striking a series of tires of known, different pressures, with a suitably instrumented hammer. Each tire is struck with a constant and known Mechanical Impulse Value, $MIV_{calibration}$. As described in Example 3, this will yield a calibration curve such as FIG. 7 for that tire at $MIV_{calibration}$ which relates peak force to tire pressure.

Next, using an instrumented hammer of the first preferred embodiment as shown in FIG. 8, a tire whose pressure is unknown is struck with a blow of a different Mechanical Impulse Value, $MIV_{measurement}$. Force versus time data during this blow of intensity $MIV_{measurement}$ is collected and stored. The force versus time data is integrated to determine the mechanical impulse value of the blow, $MIV_{measurement}$. Then, the ratio of $MIV_{calibration}$ to $MIV_{measurement}$ is calculated to obtain a scaling factor S. The stored force versus time data collected during the blow is multiplied by this scaling factor S, yielding scaled force versus time data. This data is then compared to the calibration curve for the tire, e.g. as shown in FIG. 7, to determine the pressure in the tire.

A Second Preferred Embodiment of an Instrumented Hammer

Example 4

To determine whether accurate tire pressure can be obtained with an arbitrary scaling factor for obtaining a calibration curve, the following procedure was devised and followed.

Figure 15:
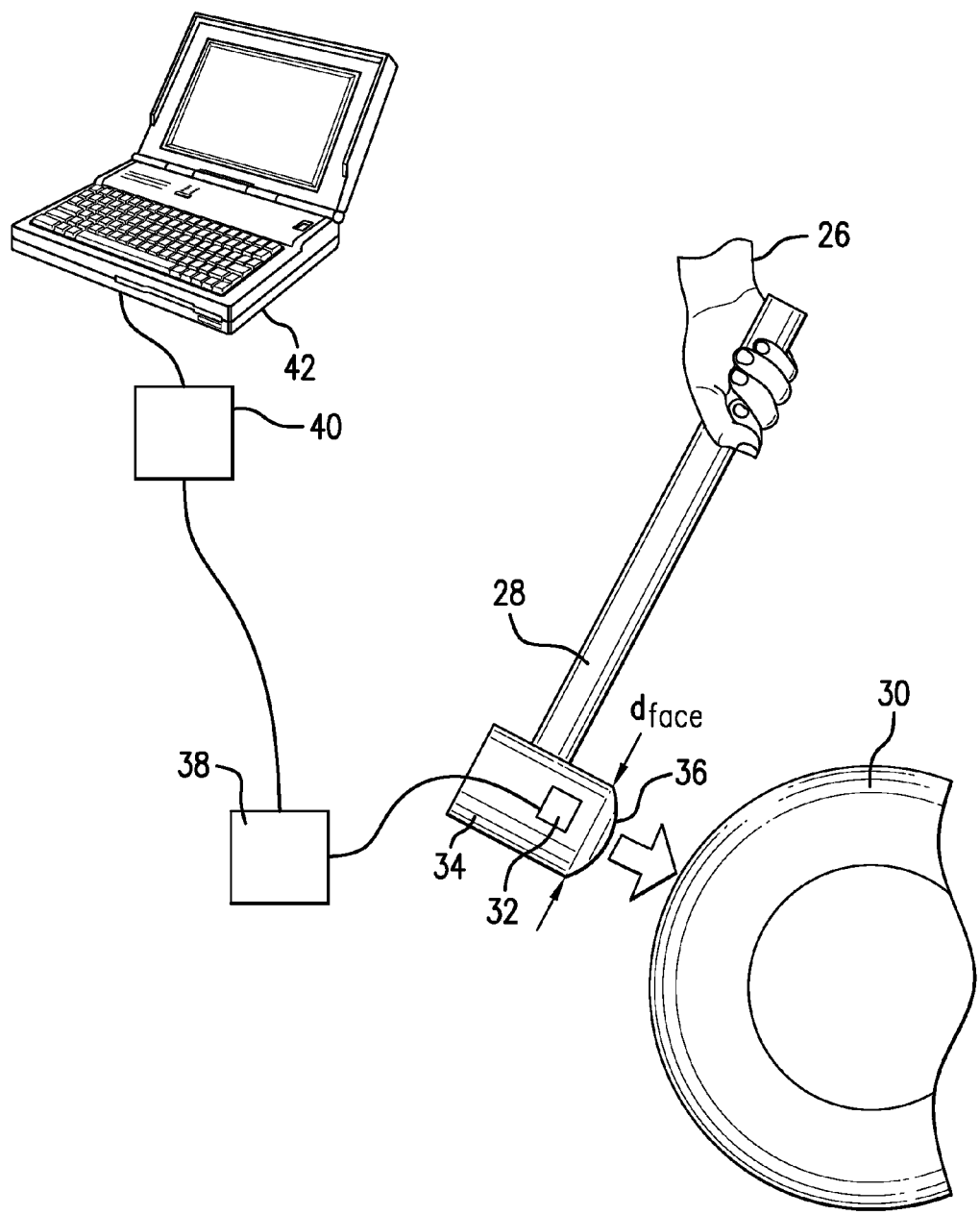
FIG. 15 is a schematic depiction of a test and calibration of a second preferred embodiment in use by a human operator.

Referring now to FIGS. 15-19, a schematic illustration of a second preferred embodiment in use by a human operator is shown in FIG. 15. A 750 gram impulse hammer 28 (Kistler brand, model 99726A5000) was used by operator 26 to strike an automobile tire 30 (Nokian P205/55R16). The impulse hammer 28 was equipped with a 27 kHz resonant frequency range quartz force sensor 32 located in the head 34, in line with the striking face 36 of the hammer 28. Striking face 36 has a diameter $d_{face}$ of 1.26 inches. The impulse hammer 28 is powered with a power supply 38 (Kistler brand power supply coupler model 5114S1). Data was acquired at 5 kHz using A/D converter data acquisition system 40 (MicroDAQ brand Data Acquisition, 8 channel, 50 kHz maximum rate Model USB-1208FS). As in the previous examples, data was transferred to a personal computer 42, where it was processed with algorithms written in MATLAB® (Version R2010b) software to analyze the mechanical impulse of the impulse hammer 28 striking the automobile tire 30 held at a known pressure.

A different calibration scheme was used for this test set-up. To obtain a calibration, the automobile tire 30 was set to a predetermined pressure. However, rather than a single calibrated blow delivered by a pendulum, the operator 26 swung the hammer 28 to strike the automobile tire 30 with the striking face 36 of hammer 28. At each tire pressure, the operator 26 struck the tire 30 with a series of 5 sequential blows of varying mechanical impulse values.

The data from the force sensor 32 was analyzed as follows. First, raw data, in the form of observation number vs. voltage, was acquired from the force sensor 32, which is located in line with striking face 36 of instrumented hammer 28. Next, the observation number was converted to time, using the data acquisition collection frequency of 5 kHz.

This voltage signal was searched for periods where it is invariant. These data were used as zero values and were subtracted from all the force data to correct for any bias in the force sensor 32. The voltage signal was then converted to force in units of lbf (pounds force), using the appropriate hammer sensitivity value. The force data, which were corrected for any bias, were searched for a maximum value, which is defined to be the peak value of the impulse.

The impulse duration was found by first searching the force data forward and backward from this peak value location, for the impulse start and end, by scanning for the first crossing at a search threshold which is set at an appropriate value, ranging from 1-6 lbf. These time values for the start and end of the blow to the automobile tire 30 were stored and the time value for the start of the blow to the automobile tire 30 was subtracted from the time value of the finish of the blow to the automobile tire 30. The resulting difference was stored as the duration of the impulse.

The force vs. time curve for the blow to the automobile tire 30 was integrated from the start time to the finish time, using Simpson's rule, yielding the Mechanical Impulse Value in lbf-sec for that particular tire pressure and that particular hammer blow, $MIV_{blow}^1$. This data collection and analysis was repeated for each of the five blows on automobile tire 30, yielding a Mechanical Impulse Value for each blow, $MIV_{blow}^1$, $MIV_{blow}^2$, etc.

Figure 16:
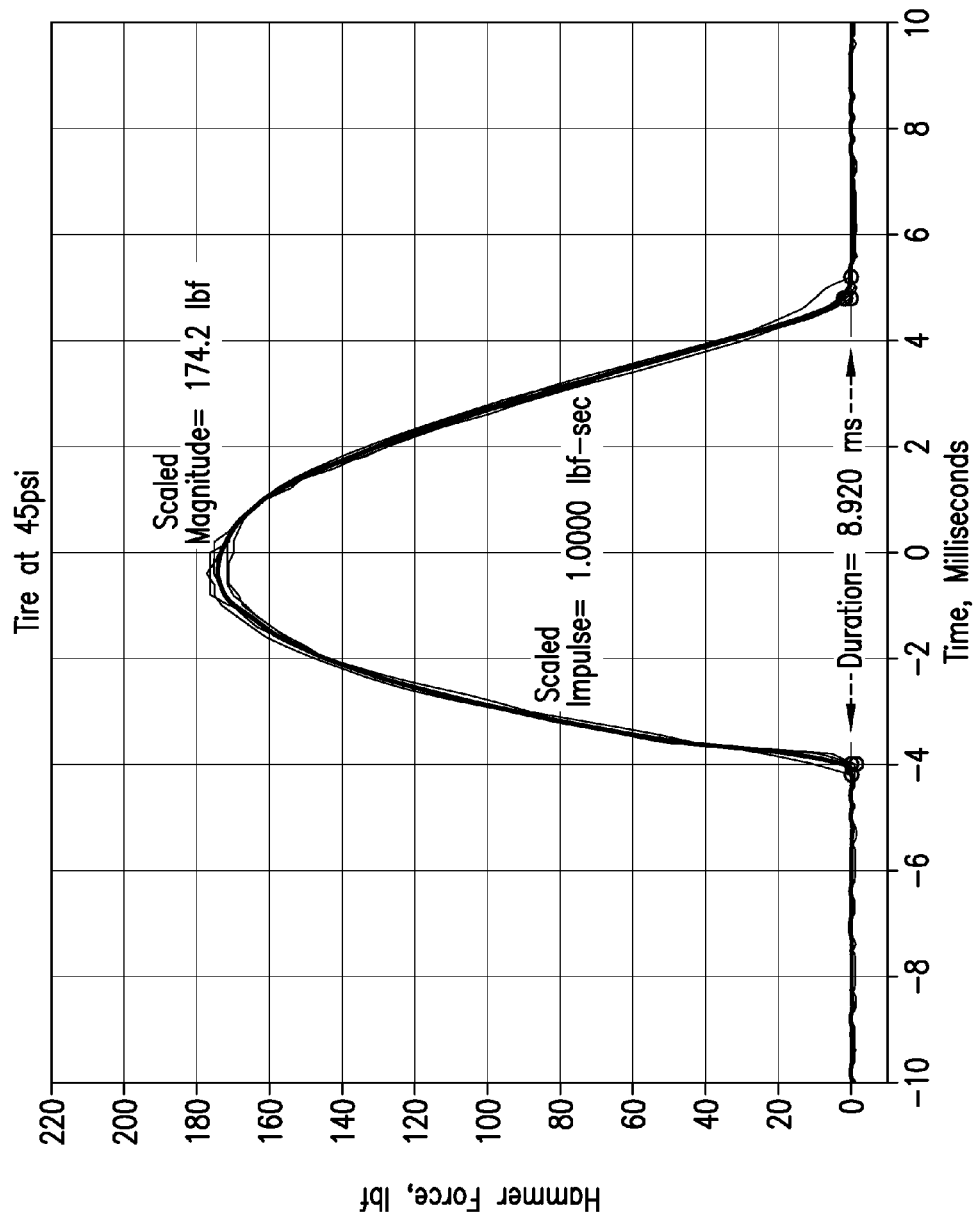
FIG. 16 illustrates data generated from the second preferred embodiment correlative to five scaled hits on an automobile tire containing air at 45 psi.
Figure 17:
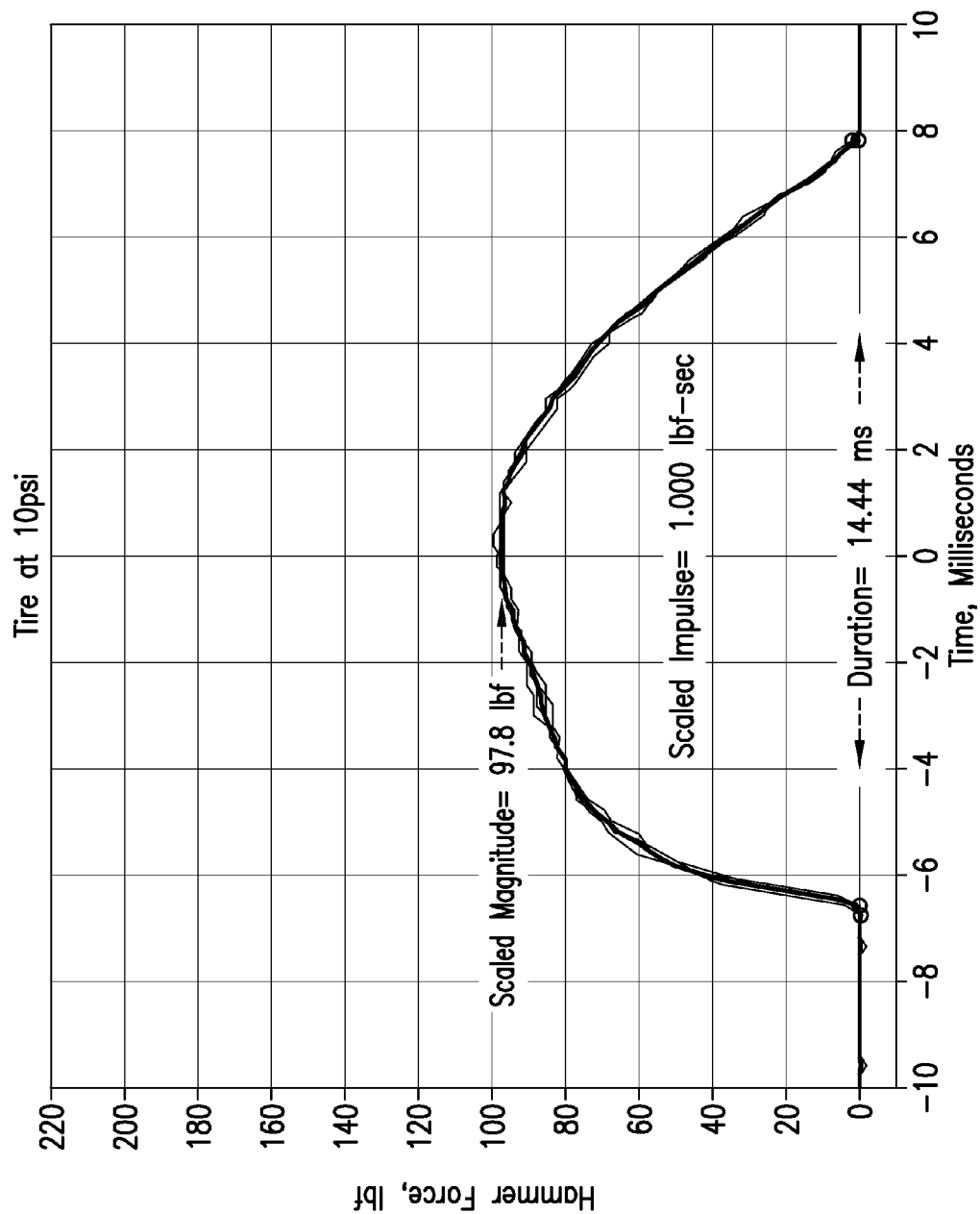
FIG. 17 illustrates data generated from the second preferred embodiment correlative to five scaled hits on an automobile tire containing air at 10 psi.
Figure 18:
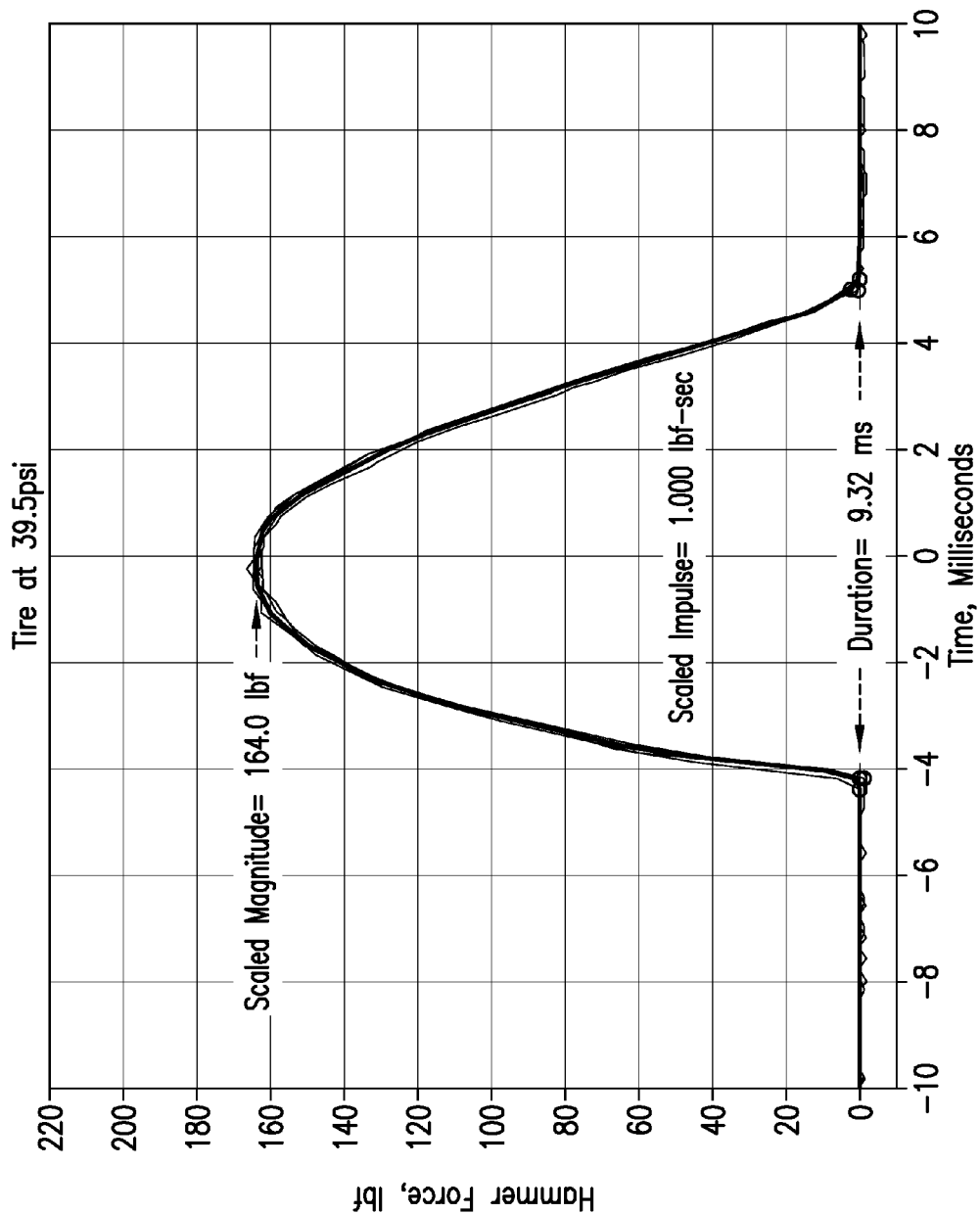
FIG. 18 illustrates data generated from the second preferred embodiment correlative to five scaled hits on an automobile tire containing air at 39.5 psi.

For the automobile tire 30 held at 45 psi, the $MIV_{blow}^n$ of each of these five blows ranged from 0.55 lbf-sec to 1.44 lbf-sec. Each of these five blows was then scaled to an arbitrary reference mechanical impulse value, $MIV_{reference}$ of 1.00 lbf-sec. FIG. 16 shows these five scaled blows on automobile tire 30, held at 45 psi all plotted together, along with their mean. FIG. 16 demonstrates clearly that these five arbitrary, different magnitude blows superimpose very closely onto each other, once they have been scaled to $MIV_{reference}$. This is shown also in FIGS. 17 and 18 for tires held at 10 psi and 39.5 psi, respectively.

While $MIV_{reference}$ is arbitrary, in general, it is convenient to select an $MIV_{reference}$ that is in the range of the Mechanical Impulse Value for a typical blow to a tire.

The averages of scaled peak force and duration of these five scaled blows are next calculated. For the automobile tire 30 held at 45 psi, the average scaled peak force and average scaled duration from five repeated blows were 174.2 lbf and 8.92 ms, respectively. To make a complete calibration for automobile tire 30, this process of averaging five scaled hits was repeated for the automobile tire 30 held at 10 psi, 24.5 psi, 39.5 psi and 53.5 psi, as measured with a Bourdon tube type gauge.

Figure 19:
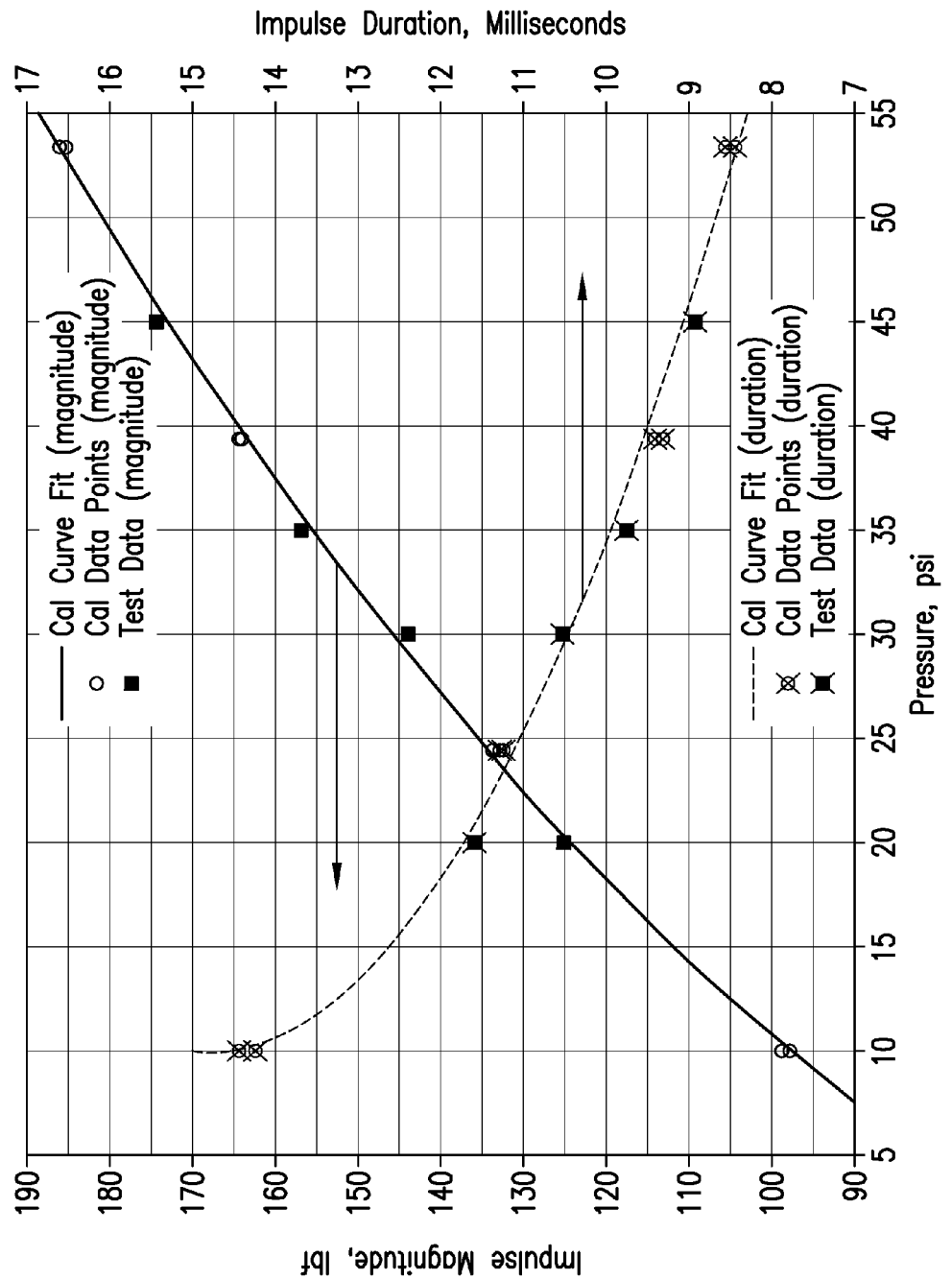
FIG. 19 illustrates calibration curves relating peak force and impulse duration to tire pressure generated from the second preferred embodiment.

The calibration curves for both peak force and impulse duration versus pressure are shown together in FIG. 19. Also shown plotted in FIG. 19 are second-order polynomial least-squares curves fit to the calibration data. In addition to the calibration points at known tire pressures of 10, 24.5, 39.5 and 53.5 psi, test data points for tires held at pressures not used to determine the calibration curve are also shown.

To measure the pressure of a tire of the same type as automobile tire 30, held at an unknown pressure, it is required only that the Mechanical Impulse Value obtained during the blow is scaled to the same $MIV_{reference}$ as the data that were used to develop the calibration curve for the type of tire, such as shown in FIG. 19.

Table 3 shows that either peak force or impulse duration can be related to tire pressure, using calibrations such as shown in FIG. 19 for peak force or for impulse duration.

TABLE 3

Summary of automobile tire pressure measured with instrumented hammer 28 compared to actual tire pressure, using FIG. 19 calibrations

| Actual automobile tire pressure, psi | Tire pressure as measured using instrumented hammer and scaled peak force, psi | Tire pressure as measured using instrumented hammer and impulse duration, psi |
| --- | --- | --- |
| 20 | 20.4 | 20.9 |
| 30 | 29.2 | 29.5 |
| 35 | 35.9 | 37.1 |
| 45 | 46.0 | 46.8 |

The calibration curve fits used to calculate the pressures shown in Table 3 are as follows:

$$P=1.81436\times10^{-3}F_p^2-2.16136\times10^{-2}F_p-5.27698 \quad (1)$$

where P=pressure in psi and $F_p$=scaled peak force in lbf.

$$P=1.06062D^2-31.4346D+2.42839\times10^2 \quad (2)$$

where P=pressure in psi and D=impulse duration in ms.

These results show that it is not necessary to use a calibrated blow, e.g. a pendulum, to a tire to obtain a useful calibration for either peak force to pressure or impulse duration to pressure. Excellent calibration is obtained by scaling arbitrary blows to an arbitrary Mechanical Impulse Value, $MIV_{reference}$. Improved accuracy is achieved by averaging a series of approximately 5 scaled blows for both the calibration and for test data.

Therefore, an instrumented hammer equipped with sensors capable of measuring, for example force, acceleration or contact time, can be used to measure tire pressure using an appropriate measurement, such as shown in FIG. 16, and comparing that data to a calibration curve such as FIG. 19.

A Third Preferred Embodiment of an Instrumented Hammer

Figure 20:
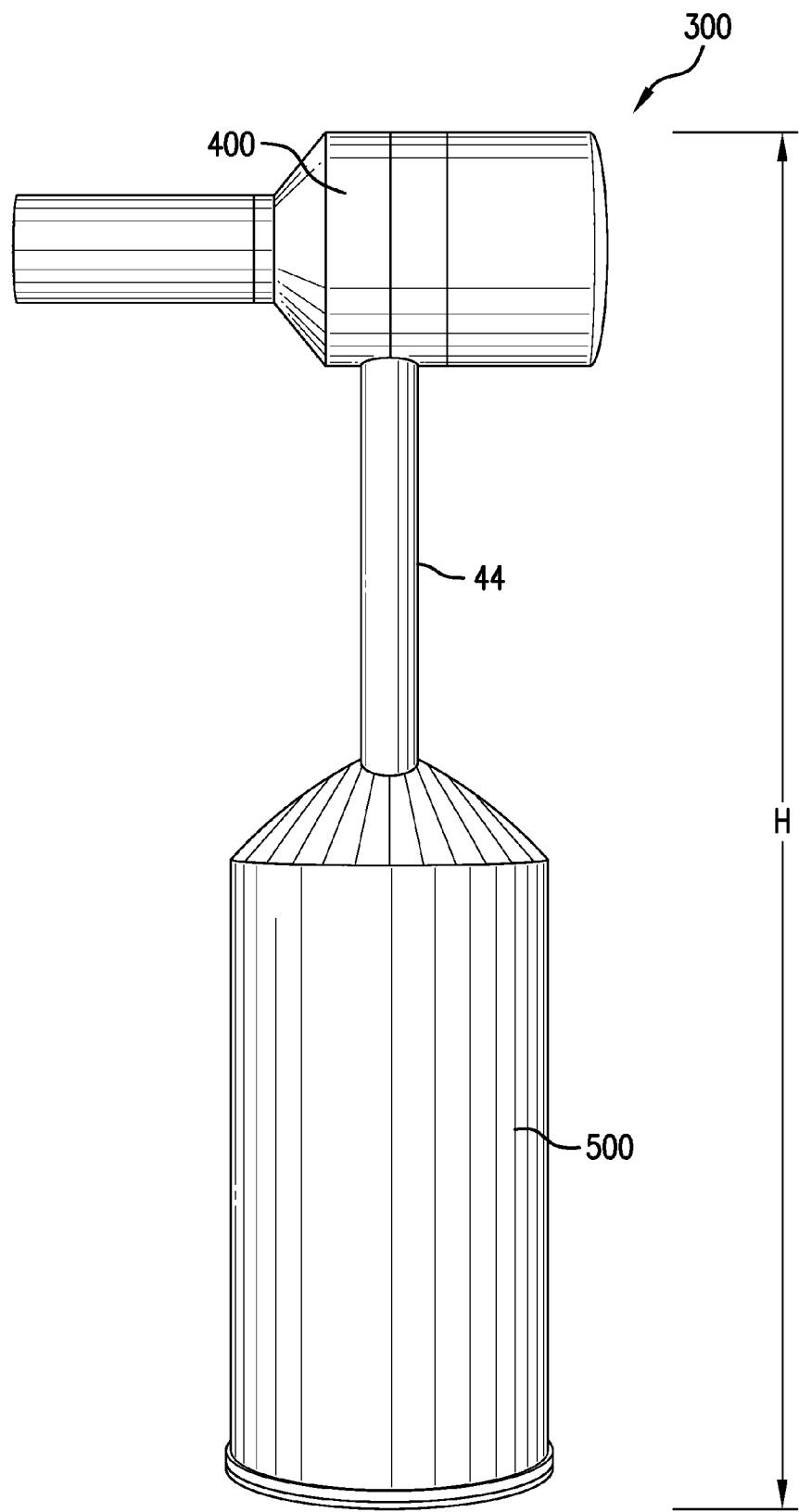
FIG. 20 is a schematic illustration of a third preferred embodiment.
Figure 22:
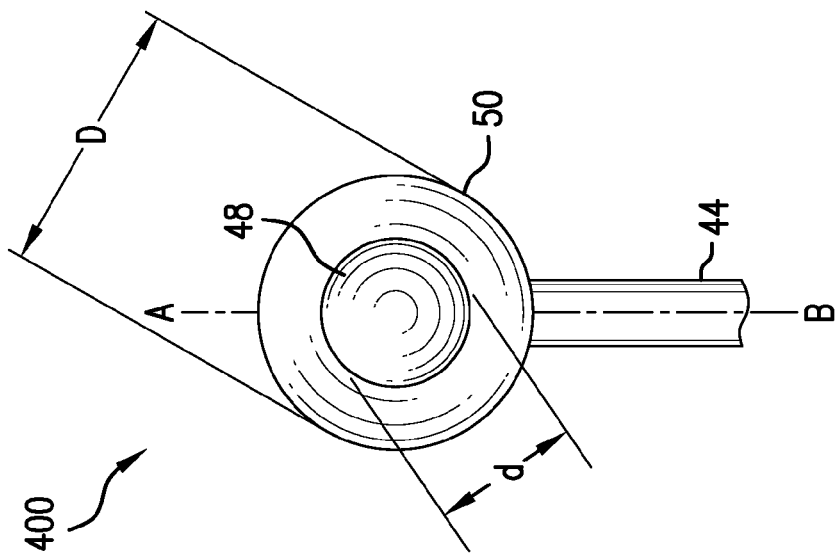
FIG. 22 is a front view a schematic illustration of a subassembly of a third preferred embodiment.
Figure 23:
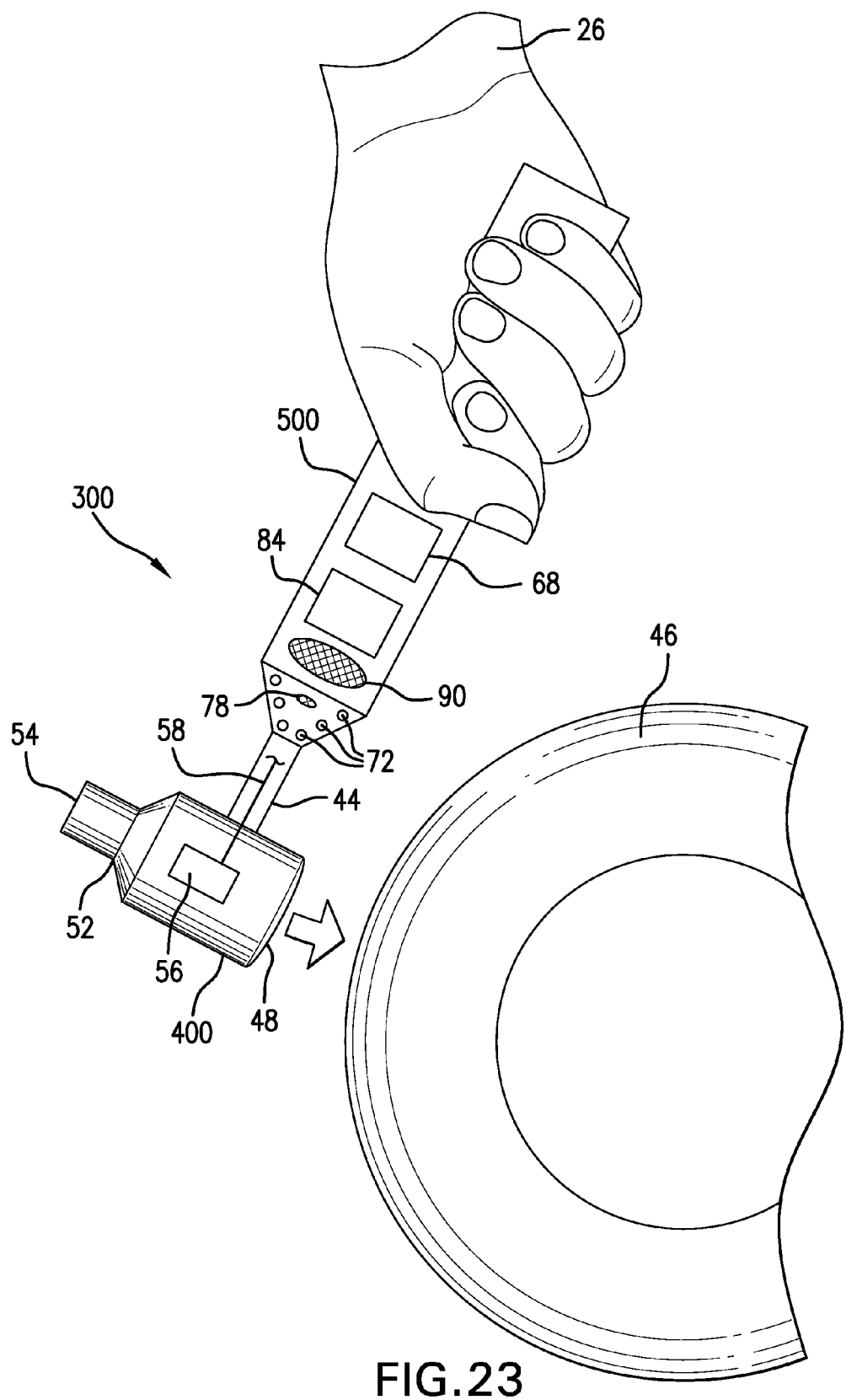
FIG. 23 is a schematic illustration of a third preferred embodiment in use by a human operator.

Referring now to FIGS. 20 through 26, a third preferred embodiment of an instrumented hammer to be used in the foregoing fashion is described. FIG. 20 is a schematic illustration of an instrumented hammer 300. The hammer 300 comprises three parts: a head 400; a handle 500 and a neck 44. The neck 44 connects the head 400 and the handle 500. Referring briefly to FIG. 23, it can be seen that the hammer 300 is constructed to be of a convenient size and shape so as to be held in the hand of an operator 26 and swung to strike a tire 46, whose pressure is to be determined. Specifically, the hammer 300 may be 10 to 14 inches in height, H, as shown in FIG. 20.

Figure 21:
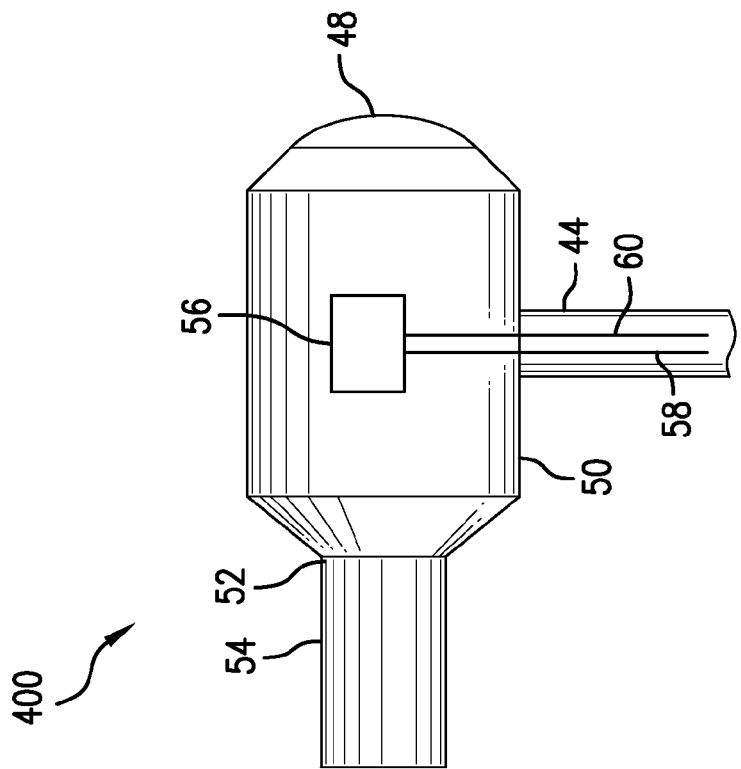
FIG. 21 is a cutaway side view of a schematic illustration of a subassembly of a third preferred embodiment.

Referring now to FIGS. 21 and 22, the head 400 is shown schematically in more detail. FIG. 21 is a cutaway cross section of the head 400 taken along a line AB shown in FIG. 22. FIG. 22 is a schematic front view of head 400. The head 400 is preferably cylindrical and has a striking face 48 located at the front end. This striking face 48 is comprised of a suitably durable and rigid engineering material so as to withstand striking the tire 46. The striking face 48 is shaped such that the tire impact is optimized for subsequent analysis. Shown in FIG. 22, the diameter d of the striking face 48 is approximately 1.25 to 1.75 inches. The outside 50 of the head 400 is of diameter D, which may be the same or different than diameter d of the striking face 48.

FIG. 21 shows a schematic, cutaway cross-section of head 400 and a portion of the neck 44. The head 400 has a back end 52 opposite the striking face 48. The neck 44 extends from the outside 50 of the head 400 between the striking face 48 and the back end 52. The neck 44 is constructed and arranged so as to be capable of transferring a force transmitted by the hand of the operator 26 holding handle 500 to the head 400 when the instrumented hammer 300 is swung to strike the tire 46 on the striking face 48 of the head 400, as shown in FIG. 23.

Referring again to FIG. 21, it can be seen that extending from the back end 52 of the head 400 is a removable, interchangeable weight 54. The back end 52 of the head 400 and the weight 54 are both constructed and arranged to permit the removable interchangeable weight 54 to be removed and either replaced with another, different weight or left off entirely.

The head 400 is further constructed and arranged to receive an acceleration sensor 56, located in the interior of head 400 between the striking face 48 and the back end 52. The sensing axis of acceleration sensor 56 is oriented parallel to the center axis of head 400, in line and orthogonal to the center of striking face 48.

The acceleration sensor 56 may be of any suitable type, uniaxial or triaxial that is capable of collecting data correlative to force when the striking face 48 of the hammer 300 strikes tire 46, as shown in FIG. 23. In use, when the striking face 48 strikes the tire 46, the acceleration sensor 56 collects data which is correlative to force as a function of time and transmits this data, via a data wire 58 located in the neck 44, to the handle 500. The acceleration sensor 56 is capable of collecting data at a minimum sampling rate of 1.5 kHz and preferably at least 5 kHz. The acceleration sensor 56 preferably has a minimum 250 g range.

As also shown in FIG. 21, the neck 44 is constructed and arranged to be capable of receiving wires for wired communication and power to and from handle 500. A power wire 60 and the data wire 58 lead from accelerometer 56 through the neck 44 and into the handle 500, shown in more detail in FIGS. 24 and 25.

Figure 24:
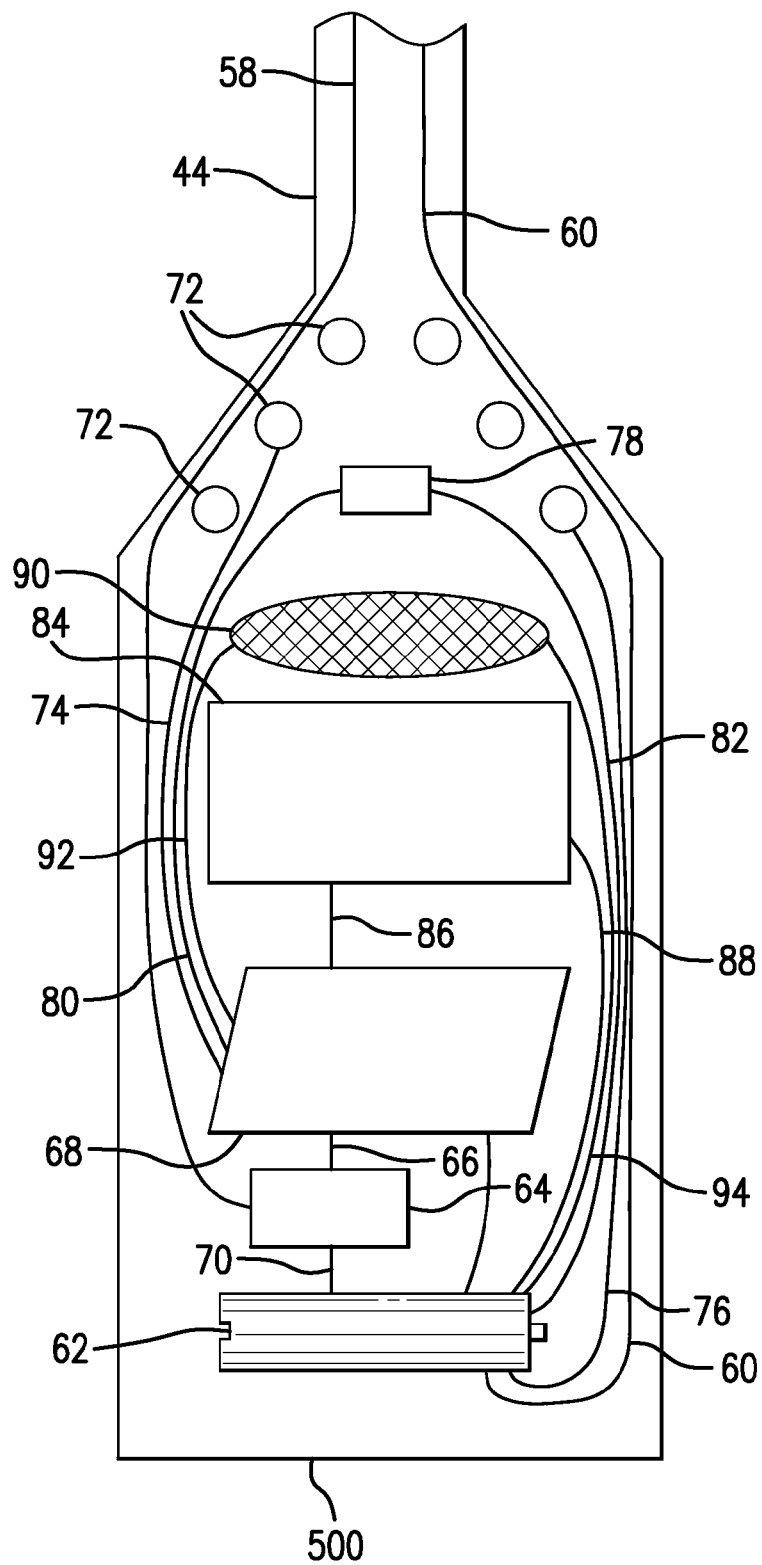
FIG. 24 is a schematic illustration of a subassembly of a third preferred embodiment.

FIG. 24 illustrates a schematic, cutaway view of the handle 500 and a portion of the neck 44 of the instrumented hammer 300. The handle 500 is constructed and arranged to receive and hold various components necessary for input/output, data analysis and power to operate these components. As shown in FIGS. 20, 21, 24 and 25, the neck 44 extends from the head 400 to the top of the handle 500 and is constructed and arranged to receive the data wire 58 from the acceleration sensor 56 and the power wire 60 to the acceleration sensor 56.

Figure 25:
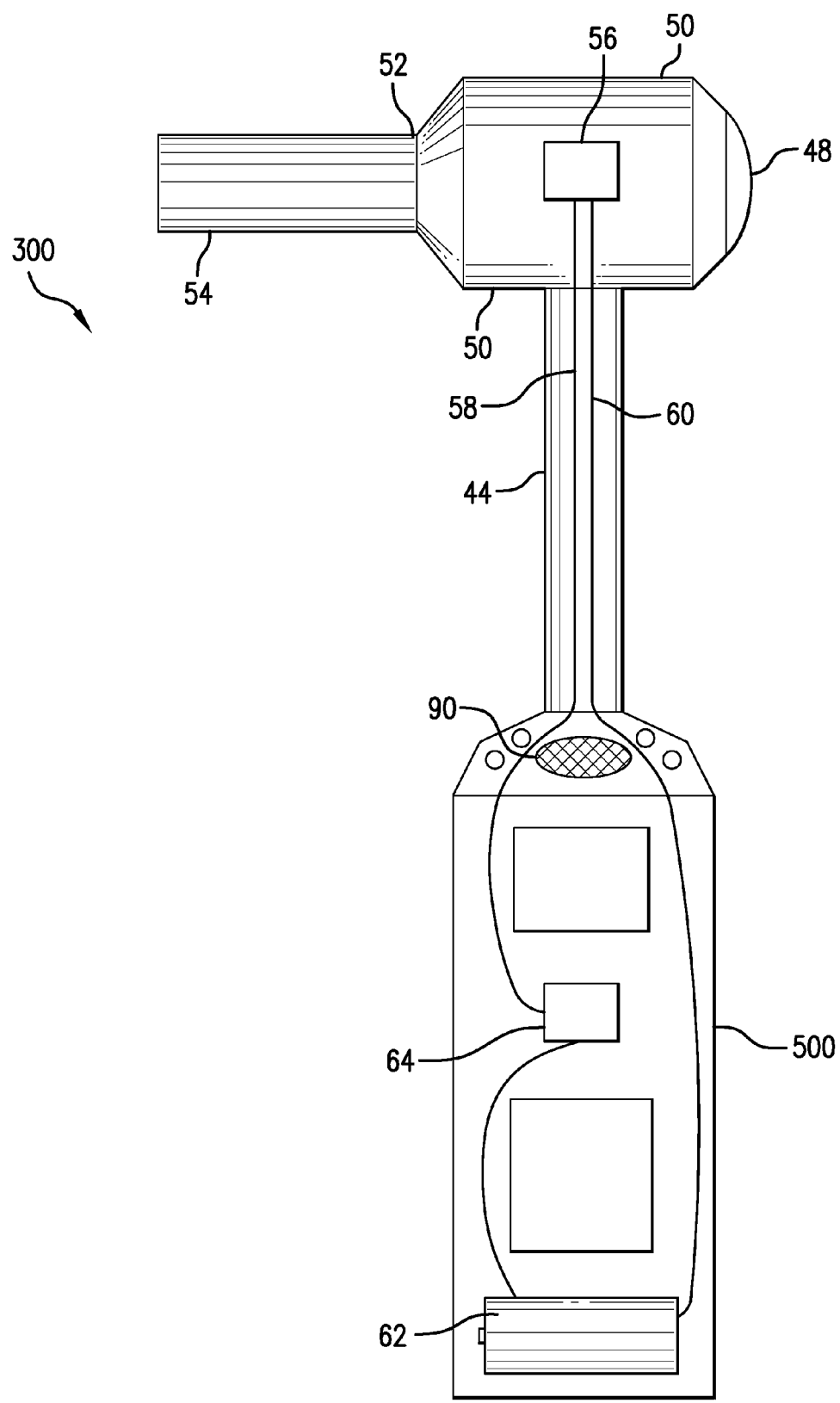
FIG. 25 is another schematic illustration of a third preferred embodiment.

The acceleration sensor power wire 60 leads to a power supply 62 contained in handle 500. This power supply 62 may be of any type capable of producing sufficient electrical power to operate the various electrical components of hammer 300. The power supply 62 may comprise for instance, a battery. Also shown in FIGS. 24 and 25 is the data wire 58 leading from the acceleration sensor 56 through the neck 44 to an analog to digital (A/D) converter data acquisition system 64. FIG. 25 is a schematic showing how the head 300 and neck 44, shown in FIGS. 21 and 22 connect to the handle 400, shown in FIG. 24. As shown in FIG. 24, the A/D converter data acquisition system 64 comprises A/D data wire 66 which transmits digital data to a processor 68 located in handle 500. The A/D converter data acquisition system 64 receives power from power supply 62 via A/D power wire 70.

Referring now to FIG. 24, the processor 68 receives and analyzes data received from the acceleration sensor 56 to calculate pressure in the tire 46 (shown in FIG. 23). The processor 68 also receives data from a plurality of input components located in handle 500. Input components may be used by the operator 26 to transmit information to the processor 68 so that the processor 68 can analyze the force versus time data received from acceleration sensor 56 to calculate the pressure in tire 46.

The input components comprise the following items. Input button(s) 72 located on the exterior of handle 500 transmit information or commands from the operator 26 to the processor 68 via button data wire(s) 74. For clarity, only a single button data wire 74 is shown, but it is understood that there may be a plurality of such button data wires 74 extending from the input buttons 72 to the processor 68.

The button(s) 72 receive power from the power supply 62 via button power wire(s) 76. Again, for clarity, only a single button power wire 76 is shown, but it is understood that there may be a plurality of such button power wires 76, each extending to the buttons 72 from the power supply 62.

An input microphone 78 located on the exterior of handle 500 transmits verbal information or commands from the operator 26 to the processor 68. Microphone data wire 80 leads from the input microphone 78 to the processor 68. The microphone 78 receives power from the power supply 62 via a microphone power wire 82.

An input/output screen 84 located on the exterior of handle 500 transmits visual information, e.g. as from a pointing device or touch screen, from the operator 26 to the processor 68, via screen data wire 86. The input/output screen 84 receives power from the power supply 62 via a screen power wire 88.

The processor 68 outputs the calculated pressure of the tire 46 as well as information on the status of the instrumented hammer 300 to a plurality of output components. These output components comprise the following items.

The input/output screen 84 also displays visual information about the pressure of tire 46 and/or the status of hammer 300, via alpha numeric characters, colored lights or an analogue gauge. This information is transmitted from the processor 68 to the input/output screen 84 via the screen data wire 86.

An output speaker 90 located on the exterior of handle 500 transmits verbal information from the processor 68 to the operator 26 via speaker data wire 92. The output speaker 90 receives power from the power supply 62 via output speaker power wire 94.

The processor 68 is programmed as described in the preceding examples to be capable of analyzing force and time data obtained from the acceleration sensor 56 when the instrumented hammer 300 is used to strike the tire 46 to determine its pressure.

The processor 68 contains or receives a calibration curve, such as shown in FIG. 7, as well as the known Mechanical Impulse Value $MIV_{calibration}$ that was used to obtain the calibration such as shown in FIG. 7. The foregoing data can be pre-stored in the processor 68. Alternatively, the data can be entered into the processor 68 via buttons 72, the input/output screen 84, or verbal commands into microphone 78.

The pressure of the tire can be determined as follows. As shown in FIG. 23, an operator 26 holds the instrumented hammer 300 and impacts on the striking face 48 the tire 46, whose pressure needs to be determined with a blow of intensity $MIV_{measurement}$. The acceleration sensor 56 collects and sends to the processor 68 via A/D converter data acquisition system 64, data correlative to force versus time. The processor stores this data obtained during the blow of intensity MIV$_{measurement}$ and then integrates the force versus time data to determine the mechanical impulse value of this blow, MIV$_{measurement}$.

The processor 68 calculates the ratio of MIV$_{calibration}$ to MIV$_{measurement}$ to obtain a scaling factor S and then multiplies the stored force versus time data collected during the blow by this scaling factor, S, to yield the scaled force versus time data. The processor 68 searches for the scaled peak force in this scaled force versus time data and compares the scaled peak force to the stored or entered calibration curve for the tire 46, e.g. FIG. 7, to determine the pressure P$_{measured}$ in the tire 46. The processor 42 transmits the pressure P$_{measured}$ of the tire 46 to either or both the output speaker 90 or input/output screen 84 where the pressure P$_{measured}$ can be heard or read by operator 26.

A Fourth Preferred Embodiment of an Instrumented Hammer

Figure 26:
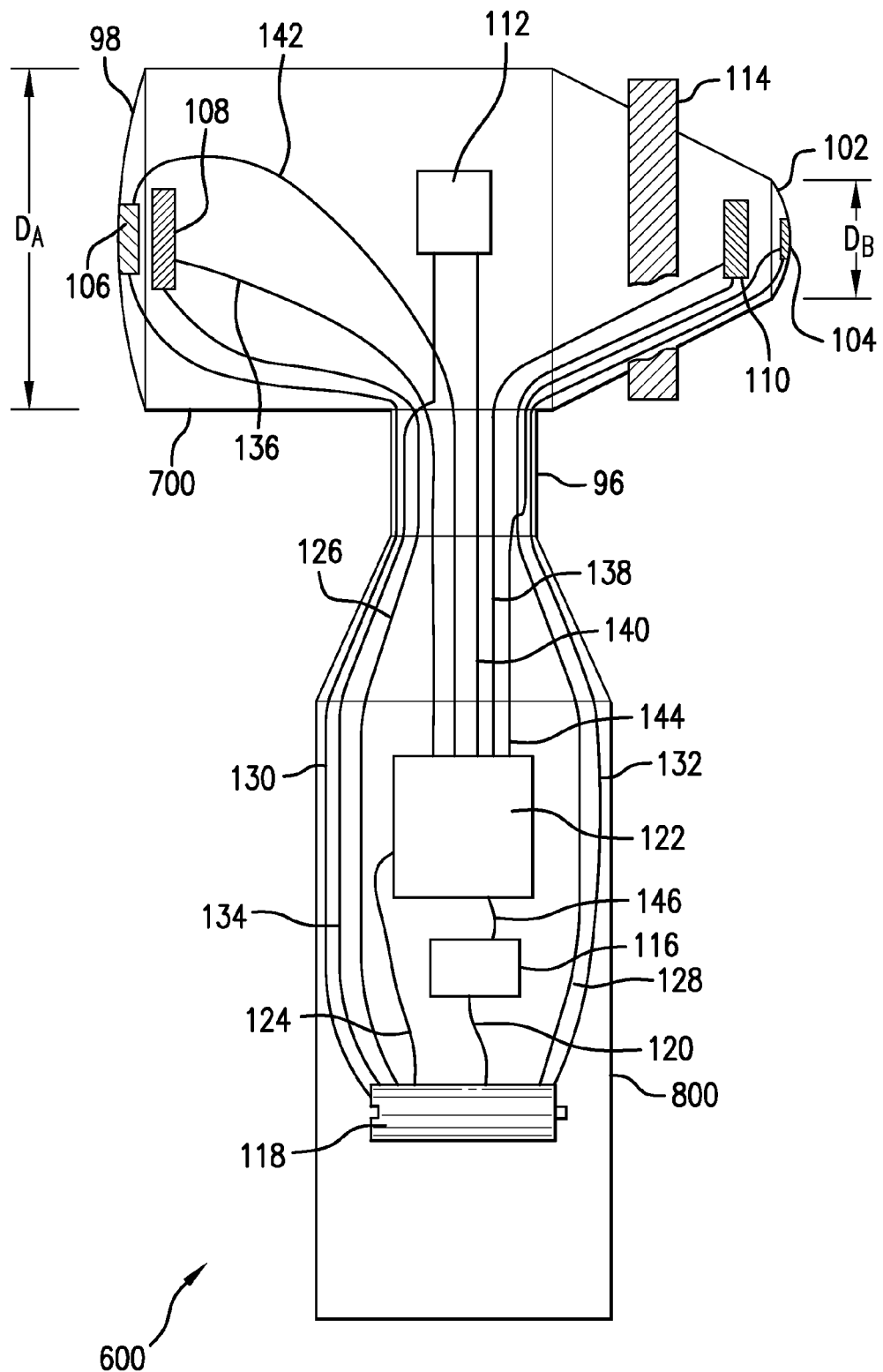
FIG. 26 is a schematic illustration of a subassembly of a fourth preferred embodiment.
Figure 27:
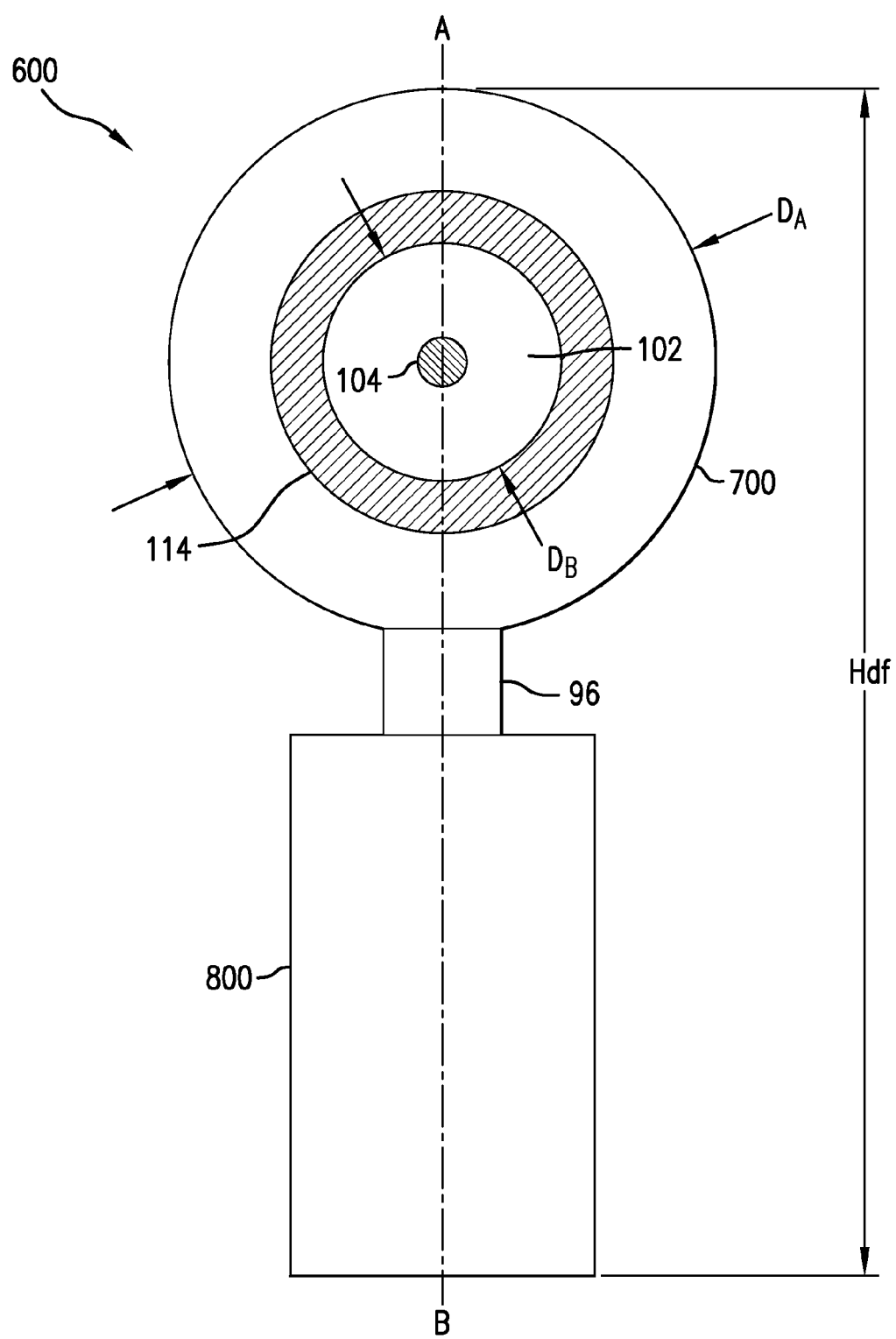
FIG. 27 is a front view schematic illustration of a subassembly of the fourth preferred embodiment.
Figure 28:
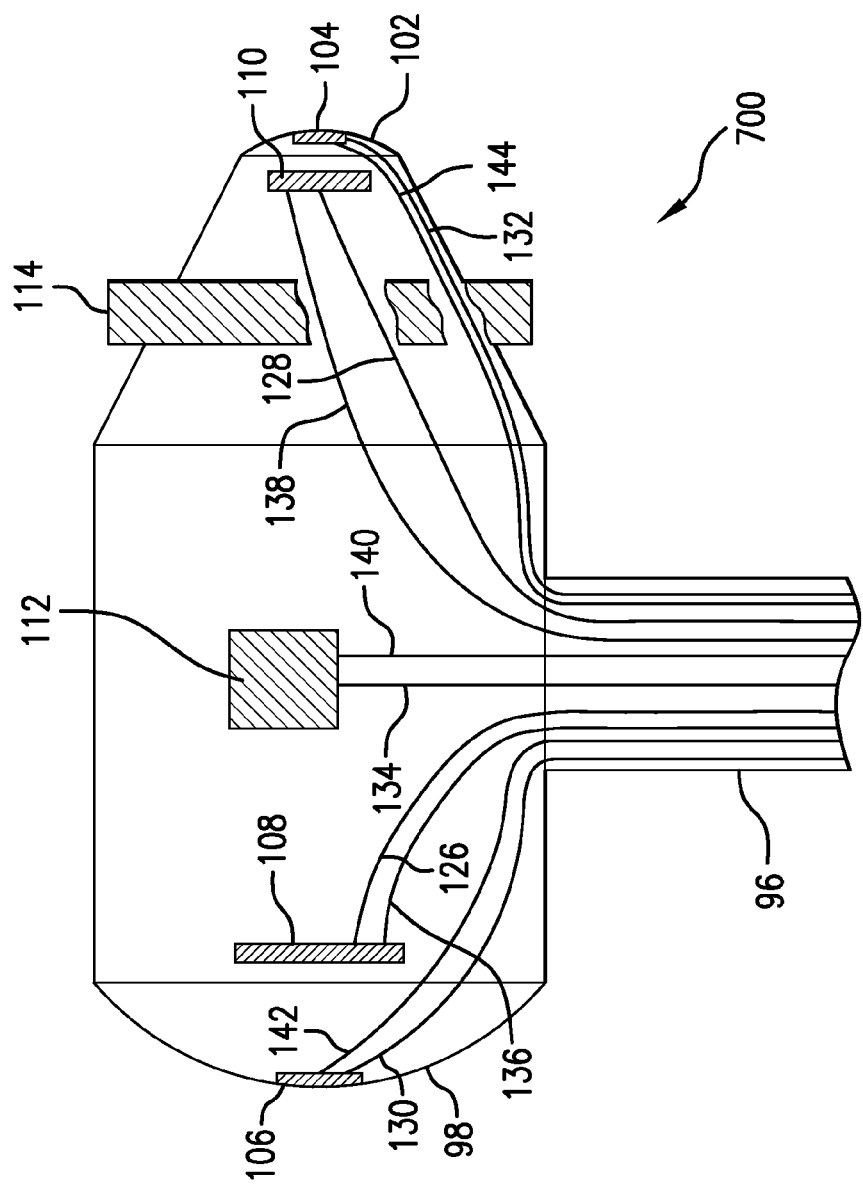
FIG. 28 is a cutaway side view schematic illustration of a section of a subassembly of the fourth preferred embodiment.

Referring now to FIGS. 26 through 31, a second preferred embodiment of an instrumented hammer to be used in the foregoing fashion is disclosed having additional features and advantages when used to measure the pressure of a tire. FIG. 26 is a schematic, cutaway side view of a dual faced wireless instrumented hammer 600. The view is taken along line AB in front view of dual faced wireless instrumented hammer 600 shown in FIG. 27. As shown in FIG. 27, the dual faced wireless instrumented hammer 600 comprises three parts; a dual faced head 700, a handle 800 and a neck 96. FIG. 28 is a schematic, cutaway view of the dual faced head 700 taken along the line AB in FIG. 27.

Figure 29:
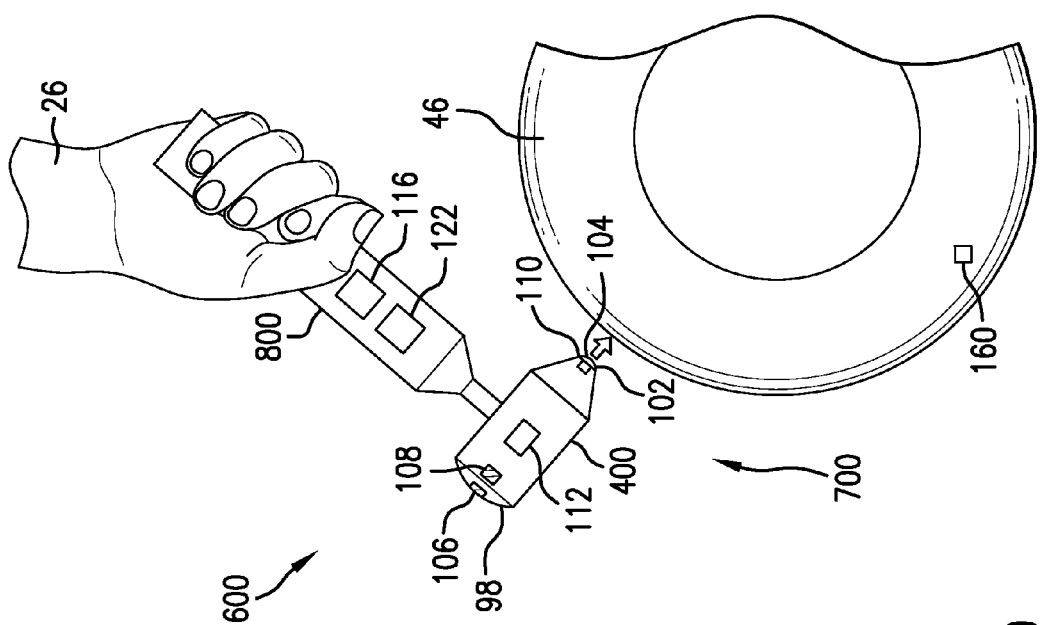
FIG. 29 is a schematic illustration of the fourth preferred embodiment in use by a human operator.
Figure 29:
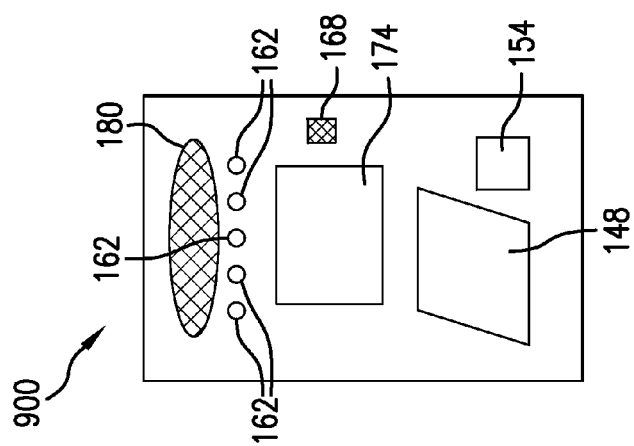

Referring to FIG. 27, the head 700 is substantially circular in cross section. The neck 96 extends from the side of the dual faced head 700 and connects the dual faced head 700 to the handle 800. Referring briefly to FIG. 29, the dual faced wireless hammer 600 is shown to be of a convenient size and shape to be held in the hand of an operator 26. The hammer is shaped to be swung to strike a tire 46 whose pressure is to be determined. Specifically, the hammer 600 may be 10 to 14 inches in height H$_{df}$.

FIG. 26 shows a schematic, cutaway side view of the dual faced wireless instrumented hammer 600, taken along the line AB in FIG. 27. The head 700 has two striking faces, striking face A 98 and striking face B 102. Striking face A 98 and striking face B 102 are located at opposite ends of dual faced head 700, with neck 96 extending from the head 700 between the two striking faces 98 and 102. The neck 96 and handle 800 are arranged and shaped so as to permit the dual faced hammer 600 to be held in the hand of operator 26 and swung to strike tire 46 on striking face B 102 as shown in FIG. 29, or reversed and swung to strike tire 46 on striking face A 98.

Striking face B 102 is shown in front view in FIG. 27 to be substantially circular in cross section, with the center axis extending through the center axis of the dual faced head 700. Striking face B 102 has diameter D$_B$. Contact sensor B 104 (FIG. 27) is positioned and arranged within striking face B 102 so as to be able to measure the impulse duration during an impact of striking face B 102 on tire 46, shown in FIG. 29.

Figure 30:
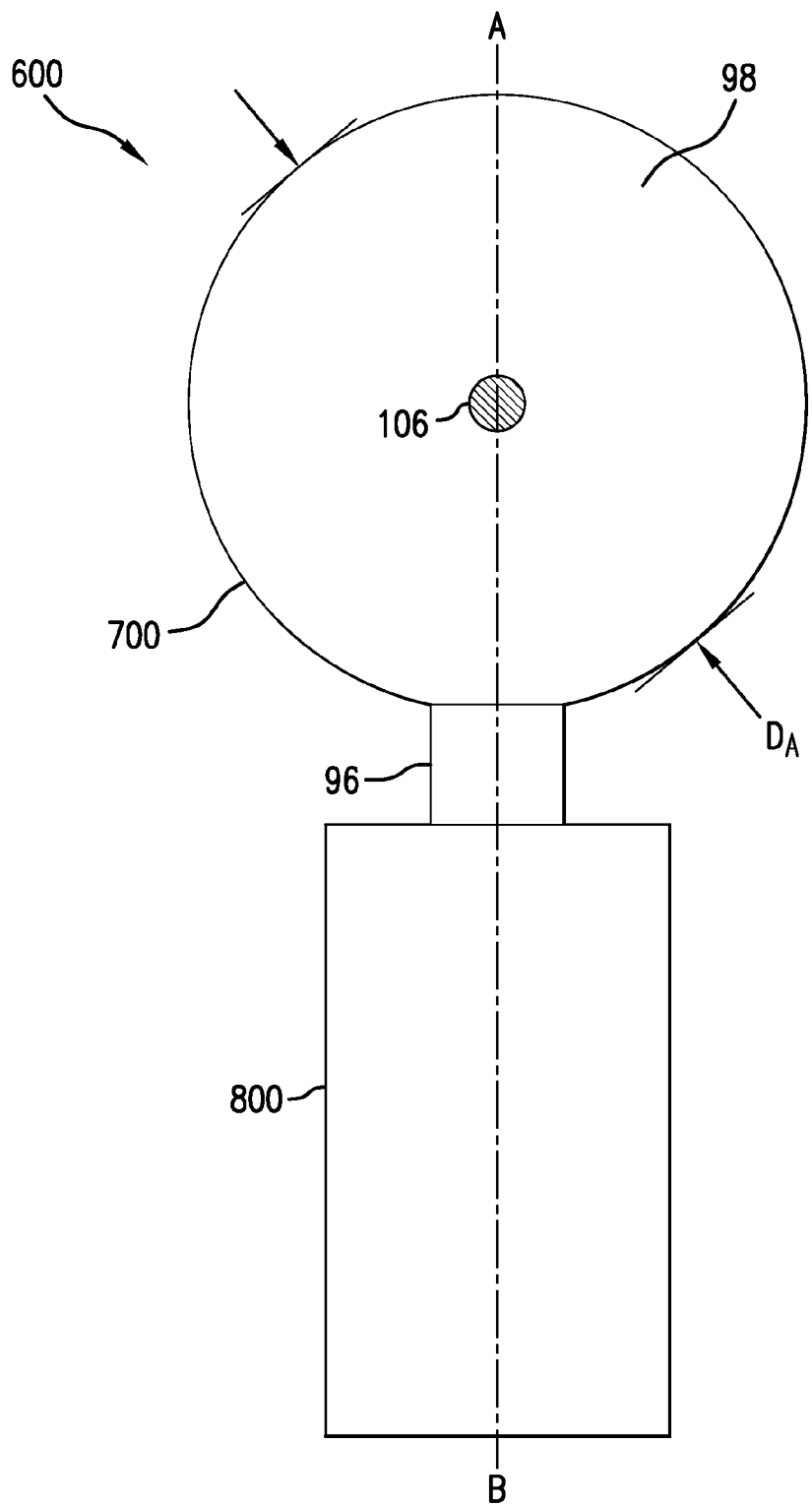
FIG. 30 is front view schematic illustration of a subassembly of the fourth preferred embodiment.

Striking face A 98 is shown in front view in FIG. 30. As shown in FIG. 30, striking face A 98 is substantially circular in cross section, with the center axis extending through the center axis of the dual faced head 700. Striking face A 98 has diameter D$_A$. Shown also in FIG. 30 is a contact sensor A 106. Contact sensor A 106 is positioned and arranged within striking face A 98 so as to be able to measure impulse duration during an impact of striking face A on tire 46, shown in FIG. 29.

As shown in FIGS. 26 and 27, striking face A 98 is of diameter D$_A$, which is different than D$_B$. Striking face A 98 and striking face B 102 have optimized convex curvature, and therefore it can be appreciated that striking face A 98 and striking face B 102 have different surface areas that contact tire 46 when swung by an operator 26 to strike the tire 46.

As shown in FIGS. 26 and 28, head 700 is further provided with a force sensor A 108 and a force sensor B 110. Force sensor A 108 is positioned in head 700 on an axis in line with the centers of striking face A 98 and striking face B 102. Force sensor A 108 is further positioned and arranged to be sufficiently close to striking face A 98 to detect force data from striking face A 98 when the hammer 600 strikes face A 98 on tire 46. Face A 98 is constructed of suitable engineering materials capable of transmitting force from the striking face A 98 to the force sensor A 108.

Likewise, force sensor B 110 is positioned in the head 700 on an axis in line with the centers of striking face A 98 and striking face B 102. Force sensor B 110 is further positioned and arranged to be sufficiently close to striking face B 102 to detect force data from striking face B 102 when hammer 600 strikes face B 102 on tire 46. Striking face B 102 is constructed of suitable engineering materials capable of transmitting force from striking face B 102 to the force sensor B 110.

The head 700 of the dual faced wireless instrumented hammer 600 is further configured and arranged to accept an acceleration sensor 112. The acceleration sensor 112 is located in the head 700 such that its sensing axis is oriented parallel to an axis in line with the centers of striking faces 98 and 102. A removable interchangeable weight 114 is constructed and arranged to be interchangeable and removable from the head 700, thus changing the anticipated impact force when the hammer 600 is swung by an operator 26 to strike the tire 46.

FIG. 26 is a cutaway of the dual faced wireless instrumented hammer 600 taken along the line AB in FIG. 27. FIG. 28 is a cutaway of the dual faced head 700 taken along the line AB in FIG. 27. Shown in FIG. 26, the handle 800 is constructed and arranged to receive and contain a wireless transmitter 116 and a suitable power supply 118. The wireless transmitter 116 is supplied with power from the power supply 118 via a transmitter power wire 120. The handle 800 is constructed and arranged to receive an analog to digital (A/D) converter data acquisition system 122. A/D converter data acquisition system 122 is supplied with power via A/D power wire 124, which leads from power supply 118 to A/D converter data acquisition system 122. The A/D converter data acquisition system 122 is constructed and arranged to convert analog data received from various sensors to digital data, using an appropriate sampling rate.

Looking now at the dual faced head 700 shown in FIGS. 26 and 28, the dual faced head 700 contains force sensor A 108 and force sensor B 110. The neck 96 receives wires that communicate between the handle 800 and the dual faced head 700. As shown in FIG. 26, a force sensor to power supply wire A 126 leads from force sensor A 108, through neck 96 to power supply 118 located in handle 800. In an analogous fashion, a force sensor to power supply wire B 128 leads from force sensor B 110, through neck 96 to the power supply 118 located in handle 800.

Similarly, contact sensor A 106 and contact sensor B 104 are supplied with power from power supply 118 located in handle 800. Contact sensor A 106 is supplied with power via a contact sensor to power supply wire A 130 which leads from power supply 118 in handle 800 through neck 96 to contact sensor A 106 located in striking face A 98 on dual faced head 700. Contact sensor B 104 is supplied with power via a contact sensor to power supply wire B 132 which leads from power supply 118 in handle 800 through neck 96 to contact sensor B 104 located in striking face B 102 on dual faced head 700.

Also contained in the dual faced head 700 is the acceleration sensor 112. Acceleration sensor 112 is supplied with power from the power supply 118 located in the handle 800, via an acceleration sensor power wire 134. Shown in FIGS. 26 and 28 are force sensor A/D wire A 136, force sensor A/D wire B 138 and acceleration sensor A/D wire 140. Shown also in FIGS. 26 and 28 are contact sensor A/D wire A 142 and contact sensor A/D wire B 144. The force sensor A/D wire A 136 leads from the force sensor A 108 through neck 96 to A/D converter data acquisition system 122. The force sensor A/D wire A 136 conveys data obtained by force sensor A 108 to A/D converter data acquisition system 122. The force sensor A/D wire B 138 leads from the force sensor B 110 through neck 96 to A/D converter data acquisition system 122. The force sensor A/D wire B 138 conveys data obtained by force sensor B 108 to A/D converter data acquisition system 122. Acceleration sensor A/D wire 140 leads from the acceleration sensor 112 though neck 96 to A/D converter data acquisition system 122. Acceleration sensor A/D wire conveys data obtained by acceleration sensor 112 to A/D converter data acquisition system 122.

Contact sensor A/D wire A 142 leads from contact sensor A 106 through neck 96 to the A/D converter data acquisition system 122. The contact sensor A/D wire A 142 conveys data obtained by contact sensor A 106 to A/D converter data acquisition system 122. The contact sensor A/D wire B 144 leads from the contact sensor B 104 through neck 96 to the A/D converter data acquisition system 122. The contact sensor A/D wire B 144 conveys data obtained by contact sensor B 104 to A/D converter 122.

FIG. 29 is a schematic illustration of the dual faced wireless hammer 600 in use. The operator 26 holds the dual faced wireless hammer 600 and swings it to strike, on either face A 98 or face B 102, the tire whose pressure is to be determined 46. In FIG. 29, face B 102 is shown about to impact tire 46. When the face B 102 strikes the tire 46, the force sensor B 110 detects the impact force and transmits this force data via A/D wire B 138 to A/D converter data acquisition system 122. Also during this blow, contact sensor B 104 detects the impulse duration and transmits this impulse duration data via contact sensor A/D wire B 144 to A/D converter data acquisition system 122.

In addition, when either face A 98 or face B 102 is swung and strikes tire 46, the acceleration sensor 112 detects acceleration correlative to force and transmits this data, via acceleration sensor A/D wire 140 to A/D converter data acquisition system 122. A/D converter data acquisition system 122 converts the analogue data received from any or all of the sensors to a digital signal using an appropriate sampling rate. This digital data is conveyed from A/D converter data acquisition system 122 to wireless transmitter 116 via A/D transmitter wire 146. Wireless transmitter 116 then transmits any or all of the force and impulse duration data taken at a suitable sampling rate to a remote wireless base station 900.

Figure 31:
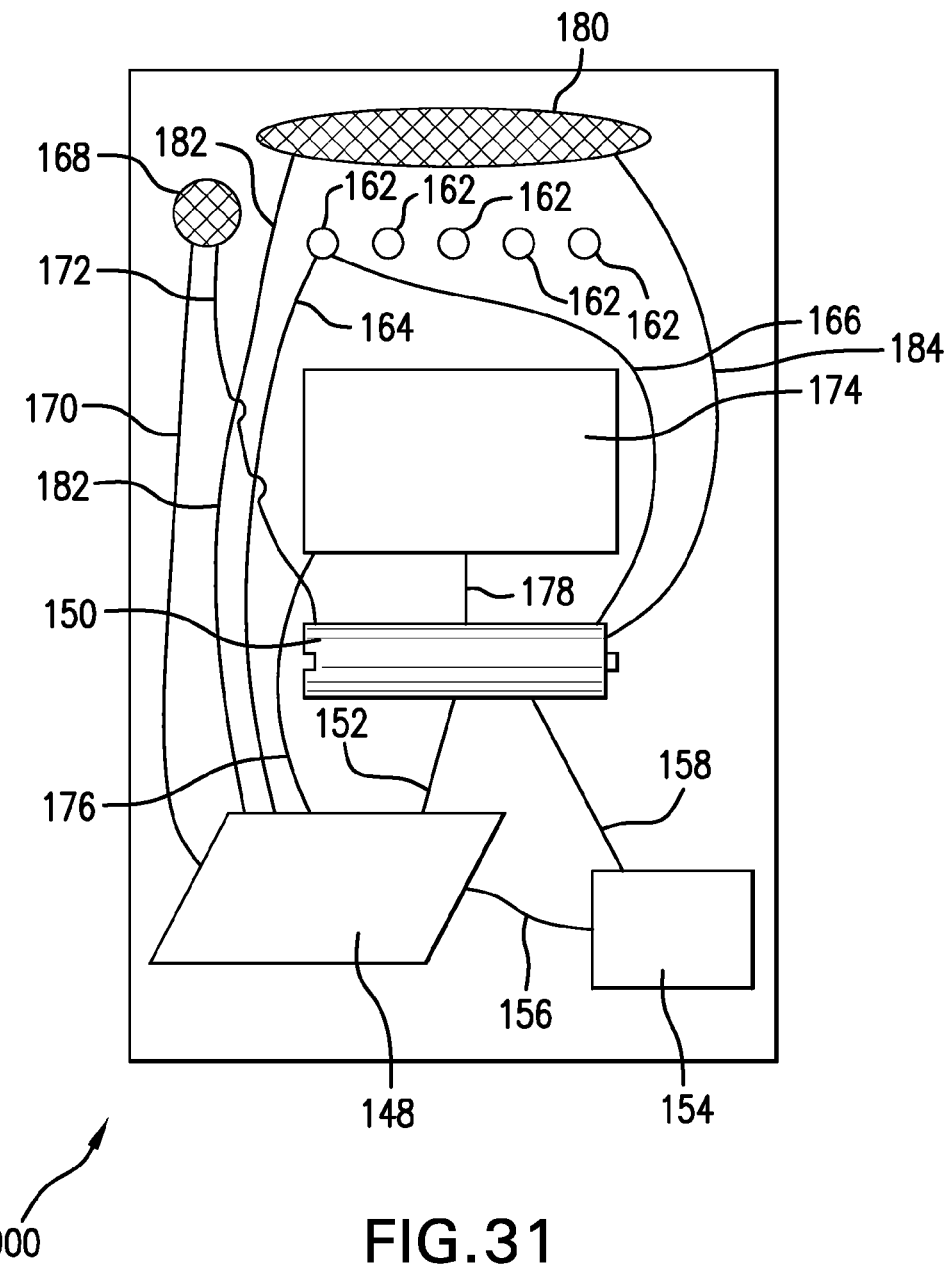
FIG. 31 illustrates a schematic illustration of another subassembly of the fourth preferred embodiment.

FIG. 31 is a schematic of a cutaway of the remote wireless base station 900. The wireless base station 900 is constructed and arranged to receive and contain components necessary for input/output, data analysis, calibration and power to operate these components. The wireless base station 900 contains a base station processor 148 powered by a base station power supply 150. This base station power supply 150 may be of any type capable of producing sufficient electrical power to operate the various components of base station 900. The base station power supply 150 may comprise, for instance, a battery. The base station processor 148 receives power from base station power supply 150 via base station power wire 152.

The base station processor 148 receives and analyzes data from a plurality of input components contained in base station 900. The base station processor 148 may also receive or have stored within it calibration curves necessary to convert force versus time data to tire pressure. The base station processor 148 may further also receive or have stored within it calibration curves necessary to convert impulse duration data to tire pressure.

These input components comprise the following items. A wireless receiver 154 is capable of receiving, wirelessly, data from the wireless transmitter 116 in hammer 600. The wireless receiver 154 in turn transmits this data to base station processor 148 via receiver data wire 156. The wireless receiver 154 receives power from power supply 150 via receiver power wire 158. Referring briefly to FIG. 29, it may be seen that embedded in tire 46 is a radio frequency identification tag (henceforth referred to as RFID tag) 160. The base station wireless receiver 154 can receive information from the RFID tag 160. RFID tag 160 may have contained in it, information about tire 46 that can be used to calculate the pressure of tire 46. This information about tire 46 may comprise, for instance, calibration data for tire 46, or physical characteristics of tire 46 that can be used, with force versus time data received from wireless hammer 600, to calculate the pressure of tire 46.

Base station input button(s) 162 located on the exterior of base station 900 can be used to transmit information or commands from the operator 26 to the base station processor 148 via base station button data wire(s) 164. For clarity only a single base station button data wire 164 is shown but it is understood that there may be a plurality of such base station button data wires extending from base station input button(s) 162 to base station processor 148. These base station input button(s) 162 receive power from the base station power supply 150 via base station input power wire 166. For clarity only a single base station button power wire 166 is shown but it is understood that there may be a plurality of such base station button power wires 166 extending from base station input button(s) 162 to base station power supply 150.

A base station input microphone 168 located on the exterior of base station 900 is used to transmit verbal information or commands from the operator 26 to the base station processor 148. Base station microphone data wire 170 leads from the base station input microphone 168 to the base station processor 148. The base station input microphone 168 receives power from the base station power supply 150 via base station microphone power wire 172.

A base station input/output screen 174 located on the exterior of base station 900 is used to transmit visual information, for instance as from a pointing device or touch screen, from the operator 26 to the base station processor 148, via base station input/output screen data wire 176. The base station input/output screen 174 receives power from base station power supply 150 via base station input/output screen power wire 178.

The base station processor 148 also can output the calculated pressure of tire 46 as well as information about the status of wireless instrumented hammer 600 to a plurality of output components. The base station input/output screen 174 displays visual information about the calculated pressure of tire 46 as well as information about on the status of wireless instrumented hammer 600, e.g., via alpha numeric characters or colored lights or analogue gauges. This information is transmitted to base station input/output screen 174 via base station input/output screen data wire 176.

A base station output speaker 180 located on the exterior of base station 900 transmits verbal information from the base station processor 148 to operator 26 via base station speaker data wire 182. Power is provided to the base station speaker 180 from base station power supply 150 via base station speaker power wire 184. The base station processor 150 is programmed to analyze force and time data obtained from the instrumented hammer 600 when the hammer 600 is used to strike tire 46 to determine its pressure. The base station processor 148 will have stored in it, or entered via base station input buttons 162 or base station input/output screen 174, or via verbal commands into base station microphone 168, a calibration curve, such as shown in FIG. 19, as well as the $MIV_{reference}$ that was used to obtain a calibration such as shown in FIG. 19.

Summary of Method of Measuring Tire Pressure Using Fourth Preferred Embodiment of an Instrumented Hammer A fourth preferred embodiment of an instrumented hammer for use to in measuring tire pressure is disclosed above. As shown in FIG. 29, operator 26 swings dual faced wireless hammer 600 and impacts either on striking face A 98 or striking face B 102 the tire 46 whose pressure is to be determined. The operator 26 strikes the tire with a series of blows of intensity $MIV_{blow}{}^n$. The respective force sensor, either force sensor A 108 or force sensor B 110 or the acceleration sensor 112, collects and sends, via A/D converter data acquisition system 122, data correlative to force versus time to the wireless transmitter 116. The wireless transmitter then wirelessly transmits the force versus time data to the base station wireless receiver 154. The wireless receiver 154 sends, via wireless receiver data wire 156, the force versus time data to base station processor 148.

The base station processor 148 stores the force versus time data obtained during the blow of intensity $MIV_{blow}{}^n$. The base station processor 106 then integrates the force versus time data to determine the mechanical impulse value of this blow, $MIV_{blow}{}^n$. The base station processor 148 has stored within it or entered via any of the input components, $MIV_{reference}$. The base station processor 148 calculates the ratio of $MIV_{blow}{}^n$ to $MIV_{reference}$ to obtain a scaling factor and then multiplies the stored force versus time data collected during the blow by this scaling factor to yield scaled force versus time data. The base station processor 148 searches for the scaled peak force in this scaled force versus time data and stores this scaled peak force value. These steps are repeated for a series of blows to tire 46, storing the peak force value for each blow. The average scaled peak force of these series of blows is then calculated and stored.

The base station processor 148 compares the average scaled peak force to the stored or entered calibration curve for the tire 46, such as shown in FIG. 19, to determine the pressure $P_{measured}$ in the tire 46. The base station processor 148 transmits the pressure $P_{measured}$ of the tire 46, to either or both the base station output speaker 180 or base station input/output screen 174 where it can be heard or read by operator 26.

Alternatively, or in addition, when the operator 26 swings dual faced wireless hammer 600 and impacts the tire 46, a force sensor collects and sends the data correlative to force versus time, via A/D converter data acquisition system 122, to the wireless transmitter 116. The force sensor that performs this task is one or more of force sensor A 108, force sensor B 110 or the acceleration sensor 112, depending on which portion of the dual faced wireless hammer impacts the tire 46. The wireless transmitter then wirelessly transmits the data to the base station wireless receiver 154. The wireless receiver 154 sends, via wireless receiver data wire 156, data correlative to force versus time to base station processor 148. The base station processor 148 analyzes the data, as described in Example 4, to determine the average impulse duration for the series of blows. This average impulse duration is compared to a calibration such as FIG. 19 to determine the pressure in tire 46. The impulse duration data is not scaled.

Alternatively, or in addition, impulse duration data obtained from either contact sensor A 106 or contact sensor B 104 is transmitted to wireless transmitter 116 via A/D converter data acquisition system 122. Wireless transmitter 116 then transmits this impulse duration data to base station processor 148. Base station processor 148 will average the impulse duration data from a series of blows to tire 46, and compare the average impulse duration to a calibration such as FIG. 19 to yield the pressure in tire 46. There is no need to scale the impulse duration data.

As thus described, a tire pressure measuring device is disclosed. The device comprises an instrumented hammer constructed and arranged for striking a pneumatic tire, generating data correlative to the force imparted to the tire as a function of time and transmitting the data to a data gathering module. The instrumented hammer further comprises a head having one or two striking faces, each face positioned with the center passing through an axis in line with the center of the head. The head further is configured to receive an acceleration sensor in line with the striking face or striking faces. The head may further be configured to receive force sensors located so as to be capable of collecting data correlative to force from the striking face or faces. The head may further be configured to receive contact sensors in the striking face or faces.

The instrumented hammer has a handle configured to be held by a human hand and having a power source disposed therein configured to supply the acceleration sensors or force sensors or contact sensors with power; and a neck connected to the head and to the handle and constructed and arranged to impart a force imparted by a human hand to the handle to the head and further configured to provide wired communication between the handle and the acceleration sensor or force sensors or contact sensors in the head.

Also described is a data gathering module constructed and arranged to receive data from the data generating impact module and communicate the data to a data processing module. The data gathering module may comprise a wire, connecting the acceleration sensors or force sensors or contact sensors to a data processing module, located in the handle. The data gathering module may also comprise a wireless transmitter, which transmits data from the force sensors or acceleration sensors or contact sensors to the data processing module which may be located remotely.

The data processing module comprises a computer or processor configured to acquire data from the acceleration sensor or force sensor or contact sensor and process the data to determine the tire pressure of the pneumatic tire and communicate the determined pressure of the pneumatic tire to a tire pressure display. The computer or processor may be located in the handle of the instrumented hammer and be in wired communication with the accelerometer or force sensor in the head of the hammer. The computer or processor may be located remotely from the instrumented hammer and be in wireless communication with the force sensors or contact sensors or acceleration sensors in the head of the hammer.

The tire pressure output display is constructed and arranged to receive the determined pressure of the pneumatic tire and provide a display of the calculated pneumatic tire pressure. The display may comprise visual or audible outputs.

In a most preferred embodiment, a tool for striking the tire would transmit data to a single device for gathering the data, processing the data and providing an audible or visual readout. Such a combination could be as compact as a lightweight, instrumented hammer weighing less than one pound and transmitting data via Bluetooth or other suitable wireless medium and a Bluetooth-capable smart-phone using an appropriate application for receiving the data, processing the data and providing an audible or visual readout of the tire pressure.

Also described is a method of measuring inflation pressure of pneumatic tires. This method comprises striking a pneumatic tire with a data generating impact module to generate data correlative to the force imparted to the tire as a function of time. The data gathering module comprises an instrumented hammer. This data is transmitted to a data gathering module constructed and arranged to receive the data from the data generating impact module. The data gathering module communicates the data to a data processing module which is constructed and arranged to receive the data from the data gathering module.

The method comprises processing the data to determine the pressure of the pneumatic tire, communicating the determined pressure of the pneumatic tire to a tire pressure display and displaying the calculated pneumatic tire pressure.

The described embodiments are to be considered in all respects only as illustrative and not restrictive, and the scope of the invention is, therefore, indicated by the appended claims rather than by the foregoing description. Those of skill in the art will recognize changes, substitutions and other modifications that will nonetheless come within the scope of the invention and range of the claims.

I claim:

1. A tire pressure measuring device comprising:
a data generating impact module constructed and arranged for striking a pneumatic tire with an impulse of arbitrary value, generating data correlative to the impulse of arbitrary value imparted to the pneumatic tire and transmitting the data to a data gathering module;
the data generating impact module further comprising a head configured to receive an acceleration sensor and having a striking face constructed and arranged to impart the impulse of arbitrary value to the pneumatic tire, an acceleration sensor positioned within the head and configured to sense an acceleration as a function of time, and a handle configured to be held by a human hand and constructed and arranged to impart the impulse of arbitrary value imparted by a human hand to the head;
the data gathering module being constructed and arranged to receive the data from the data generating, impact module and communicate the data to a data processing module;
the data processing module being constructed and arranged to receive the data from the data gathering module, process the data to determine the pressure of the pneumatic tire and communicate the determined pressure of the pneumatic tire to a tire pressure output; and
the tire pressure output being constructed and arranged to receive the determined pressure of the pneumatic tire and output the determined pressure of the pneumatic tire.

2. The tire pressure measuring device of claim 1, wherein the data processing module comprises a computer.

3. The tire pressure measuring device of claim 2, wherein the computer is configured to acquire data from the acceleration sensor and process the data to determine the pressure of the pneumatic tire.

4. The tire pressure measuring device of claim 2, wherein the computer is configured to acquire data from the acceleration sensor and process the data to determine a value correlative to a peak force and to use the value correlative the peak force to determine the pressure of the pneumatic tire.

5. The tire pressure measuring device of claim 2, wherein the computer is configured to acquire data from the acceleration sensor and process the data to determine an impulse duration and to use the impulse duration to determine the pressure of the pneumatic tire.

6. The tire pressure measuring device of claim 1, wherein the data processing module is in wired communication with the data generating impact module.

7. The tire pressure measuring device of claim 1, wherein the data processing module is in wireless communication with the data generating impact module.

8. The tire pressure measuring device of claim 1, wherein the tire pressure output comprises a visual readout.

9. The tire pressure measuring device of claim 8, wherein the visual readout comprises an LCD readout.

10. The tire pressure measuring device of claim 8, wherein the visual readout comprises an LED readout.

11. The tire pressure measuring device of claim 8, wherein the visual readout comprises an analog gauge readout.

12. The tire pressure measuring device of claim 8, wherein the visual readout comprises a digital readout.

13. The tire pressure measuring device of claim 1, wherein the tire pressure output comprises an audible sound.

14. A tire pressure measuring device comprising:
a data generating impact module constructed and arranged for striking a pneumatic tire with an impulse of arbitrary value, generating data correlative to impulse duration and transmitting the data to a data gathering module;
the data generating impact module further comprising a head configured to receive an acceleration sensor and having a striking face constructed and arranged to impart the impulse of arbitrary value to the pneumatic tire, an acceleration sensor positioned within the head and configured to sense an acceleration as a function of time, and a handle configured to be held by a human hand and constructed and arranged to impart the impulse of arbitrary value imparted by a human hand from the handle to the head;
the data gathering module being constructed and arranged to receive the data from the data generating impact module and communicate the data to a data processing module;
the data processing module being constructed and arranged to receive the data from the data gathering module, process the data to determine the pressure of the pneumatic tire and communicate the determined pressure of the pneumatic tire to a tire pressure output; and
the tire pressure output being constructed and arranged to receive the determined pressure of the pneumatic tire and output the determined pressure of the pneumatic tire.

15. A tire pressure measuring device comprising:
an instrumented hammer constructed and arranged for striking a pneumatic tire with an impulse of arbitrary value, generating data correlative to the impulse of arbitrary value imparted to the pneumatic tire and transmitting the data to a data gathering module;
the instrumented hammer further comprising a head configured to receive a force sensor and having a striking face configured to strike the pneumatic tire with the impulse of arbitrary value and a back end configured to receive a plurality of weights; a force sensor positioned in the head; a handle configured to be held by a human hand and having a power source disposed therein configured to supply the force sensor with power; and a neck connected to the head and to the handle and constructed and arranged to impart the impulse of arbitrary value imparted by the human hand from the handle to the head and further configured to provide wired communication between the handle and the force sensor in the head;

a computer configured to acquire the data correlative to the impulse of arbitrary value from the force sensor and process the data to determine the pressure of the pneumatic tire and communicate the determined pressure of the pneumatic tire to a tire pressure output display; and the tire pressure output display being constructed and arranged to receive the determined pressure of the pneumatic tire and provide a visual display of the determined pressure of the pneumatic tire.

16. A tire pressure measuring device comprising:

a data generating impact module constructed and arranged for striking a pneumatic tire with an impulse of arbitrary value, generating data correlative to the impulse of arbitrary value imparted to the pneumatic tire and transmitting the data to a data gathering module;

the data generating impact module further comprising a head configured to receive a force sensor and having a striking face constructed and arranged to impart the impulse of arbitrary value to the pneumatic tire; a force sensor positioned within the head and configured to sense the force transferred to the striking face as a function of time, and a handle configured to be held by a human hand and connected to the head and constructed and arranged to impart the impulse of arbitrary value imparted by the human hand to the head;

the data gathering module being constructed and arranged to receive the data from the data generating impact module and communicate the data to a data processing module;

the data processing module being constructed and arranged to receive the data from the data gathering module, process the data to determine the pressure of the pneumatic tire and communicate the determined pressure of the pneumatic tire to a tire pressure output; and the tire pressure output being constructed and arranged to receive the determined pressure of the pneumatic tire and output the determined pressure of the pneumatic tire.

17. The tire pressure measuring device of claim 16, wherein the data processing module comprises a computer.

18. The tire pressure measuring device of claim 17, wherein the computer is configured to acquire data from the force sensor as a function of time and process the data to determine the pressure of the pneumatic tire.

19. The tire pressure measuring device of claim 17, wherein the computer is configured to acquire data from the force sensor as a function of time and process the data to determine a peak force and to use the peak force to determine the pressure of the pneumatic tire.

20. The tire pressure measuring device of claim 17, wherein the computer is configured to acquire data from the force sensor as a function of time and process the data to determine an impulse duration and to use the impulse duration to determine the pressure of the pneumatic tire.

21. The tire pressure measuring device of claim 16, wherein the data processing module is in wired communication with the data generating impact module.

22. The tire pressure measuring device of claim 16, wherein the data processing module is in wireless communication with the data generating impact module.

23. The tire pressure measuring device of claim 16, wherein the tire pressure output comprises a visual readout.

24. The tire pressure measuring device of claim 23, wherein the visual readout comprises an LCD readout.

25. The tire pressure measuring device of claim 23, wherein the visual readout comprises an LED readout.

26. The tire pressure measuring device of claim 23, wherein the visual readout comprises an analog gauge readout.

27. The tire pressure measuring device of claim 23, wherein the visual readout comprises a digital readout.

28. The tire pressure measuring device of claim 16, wherein the tire pressure output comprises an audible sound.

29. A tire pressure measuring device comprising:

A data generating impact module constructed and arranged for striking a pneumatic time with an impulse of arbitrary value, generating data correlative to impulse duration and transmitting the data to a data gathering module;

the data generating impact module further comprising a head configured to receive a force sensor and having a striking, face constructed and arranged to impart the impulse of arbitrary value to the pneumatic tire, a force sensor positioned within the head and configured to sense the force transferred to the striking face as a function of time, and a handle configured to be held by a human hand and constructed and arranged to impart the impulse of arbitrary value imparted by the human hand from the handle to the head;

the data gathering module being constructed and arranged to receive the data from the data generating impact module and communicate the data to a data processing module;

the data processing module being constructed and arranged to receive the data from the data gathering module, process the data to determine the pressure of the pneumatic tire and communicate the determined pressure of the pneumatic tire to a tire pressure output; and the tire pressure output being constructed and arranged to receive the determined pressure of the pneumatic tire and output the determined pressure of the pneumatic tire.

* * * * *